(12) United States Patent
Beng

(10) Patent No.: US 6,220,397 B1
(45) Date of Patent: Apr. 24, 2001

(54) ANTI ICE SKIDDING APPARATUS

(76) Inventor: Lim Hwee Beng, Blk. 157, No. 03-09, Tampines Street 12, Singapore, 521157 (SG)

(*) Notice: Subject to any disclaimer, the term of this patent is extended or adjusted under 35 U.S.C. 154(b) by 0 days.

(21) Appl. No.: 09/326,318

(22) Filed: Jun. 7, 1999

(51) Int. Cl.$^7$ ...................................................... B60T 1/14
(52) U.S. Cl. .................................. 188/5; 188/6; 188/16; 303/3
(58) Field of Search .......................... 188/5–8, 2 R, 188/4 R, 4 B, 16; 180/9.46, 164, 15; 280/766.1, 767, 188; 303/2–3

(56) References Cited

U.S. PATENT DOCUMENTS

| 764,960 | * | 7/1904 | Rourke ..................................... | 188/5 |
| 904,983 | * | 11/1908 | Oakes ...................................... | 188/6 |
| 923,332 | * | 6/1909 | Clergy et al. ............................ | 188/5 |
| 1,006,659 | * | 10/1911 | Hormel .................................... | 188/5 |
| 1,053,200 | * | 2/1913 | Moore ..................................... | 188/5 |
| 1,091,142 | * | 3/1914 | Keech ..................................... | 188/5 |
| 1,102,932 | * | 7/1914 | Lautenbachern et al. .............. | 188/5 |
| 1,195,974 | * | 8/1916 | Campbell ................................ | 188/5 |

(List continued on next page.)

FOREIGN PATENT DOCUMENTS

| 1036076 | * | 8/1958 | (DE) | .......................................... | 188/5 |
| 3437402 | * | 4/1986 | (DE) | .......................................... | 188/6 |
| 498517 | * | 10/1919 | (FR) | .......................................... | 188/5 |
| 32104 | * | 4/1927 | (FR) | .......................................... | 188/5 |
| 60-154943 | * | 8/1985 | (JP) | .......................................... | 188/5 |
| 62-85749 | * | 4/1987 | (JP) | . |
| 63-11464 | * | 1/1988 | (JP) | .......................................... | 188/5 |
| 2296563 | * | 12/1990 | (JP) | .......................................... | 188/6 |
| 6-80061 | * | 3/1994 | (JP) | . |
| 10-217922 | * | 8/1998 | (JP) | . |
| 1191518 | * | 4/1999 | (JP) | . |
| 1366436 | * | 1/1988 | (SU) | .......................................... | 188/6 |

Primary Examiner—Douglas C. Butler
(74) Attorney, Agent, or Firm—Michael I. Kroll

(57) ABSTRACT

An anti ice skidding apparatus for providing resistance to lateral forces acting on a vehicle. The anti ice skidding apparatus includes a disc chassis, a device for engaging a roadway pivotally connected to the disc chassis and a device for securing the disc chassis to an underside of the vehicle. A device is connected to the securing device for pivoting the securing device between a first position maintaining the disc chassis and engaging device at a distance above the roadway and a second position placing the engaging device in engagement with the roadway. The engaging device is able to engage the roadway and provide additional resistance to lateral forces acting on the vehicle when in the second position. The engaging device may be one of a plurality of rollers or a blade which will engage with icy surfaces on the roadway and cut a groove in the icy surface to provide additional resistance to the lateral forces acting on the vehicle. The plurality of rollers and the blade each include a sharp edge extending around a periphery thereof, the sharp edge acting to cut a groove on any icy or soft surfaces over which the vehicle passes when in the second engaged position.

6 Claims, 23 Drawing Sheets

U.S. PATENT DOCUMENTS

| | | | |
|---|---|---|---|
| 1,220,613 | * | 3/1917 | Dufek ................................ 188/5 |
| 1,334,644 | * | 3/1920 | Atherton ............................ 188/5 |
| 1,414,238 | * | 4/1922 | Ward .................................. 188/5 |
| 1,439,548 | * | 12/1922 | Hanley ................................ 188/5 |
| 1,501,771 | * | 7/1924 | Hanley ................................ 188/5 |
| 1,718,108 | * | 6/1929 | Boughton ........................... 188/5 |
| 1,808,797 | * | 6/1931 | Uhlman ............................... 188/5 |
| 1,972,702 | * | 9/1934 | Cohen et al. ...................... 188/5 |
| 2,049,357 | * | 7/1936 | Daignault ........................... 188/5 |
| 2,068,472 | * | 1/1937 | Royer .................................. 188/5 |
| 2,075,734 | * | 3/1937 | Lieb ..................................... 188/5 |
| 2,113,056 | * | 4/1938 | McKinnon .......................... 188/5 |
| 2,172,700 | * | 9/1939 | Duranton ............................ 188/5 |
| 2,184,664 | * | 12/1939 | Ehret .................................. 188/5 |
| 2,214,303 | * | 9/1940 | Kipen .................................. 188/5 |
| 2,232,821 | * | 2/1941 | Brown et al. ...................... 188/5 |
| 2,319,297 | * | 5/1943 | Cieri ................................... 188/5 |
| 2,478,653 | * | 8/1949 | Callan ................................. 188/5 |
| 2,608,274 | * | 8/1952 | Kromer ............................... 188/5 |
| 2,631,692 | * | 3/1953 | Leslie .................................. 188/5 |
| 2,650,679 | * | 9/1953 | Durkin ................................ 188/5 |
| 2,710,074 | * | 6/1955 | Simpson ............................. 188/5 |
| 2,871,986 | * | 2/1959 | Polovitch ............................ 188/5 |
| 2,885,030 | * | 5/1959 | Aikman ............................... 188/5 |
| 2,974,741 | * | 3/1961 | Witzmann ........................... 188/5 |
| 3,292,738 | * | 12/1966 | Bernert et al. ..................... 188/6 |
| 4,613,015 | * | 9/1986 | Skrzypek ............................ 188/6 |
| 5,752,587 | * | 5/1998 | Darling ............................... 188/5 |

* cited by examiner

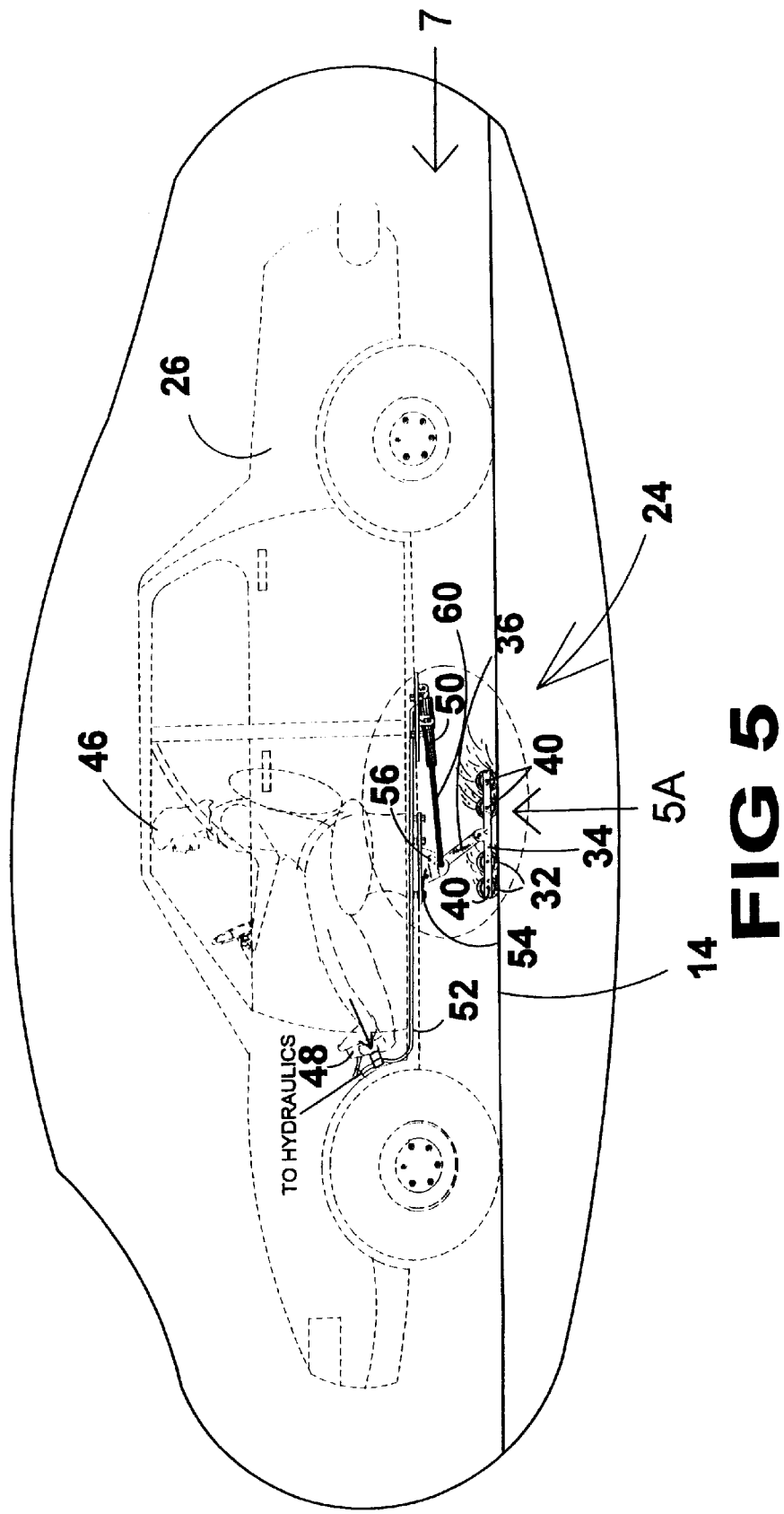

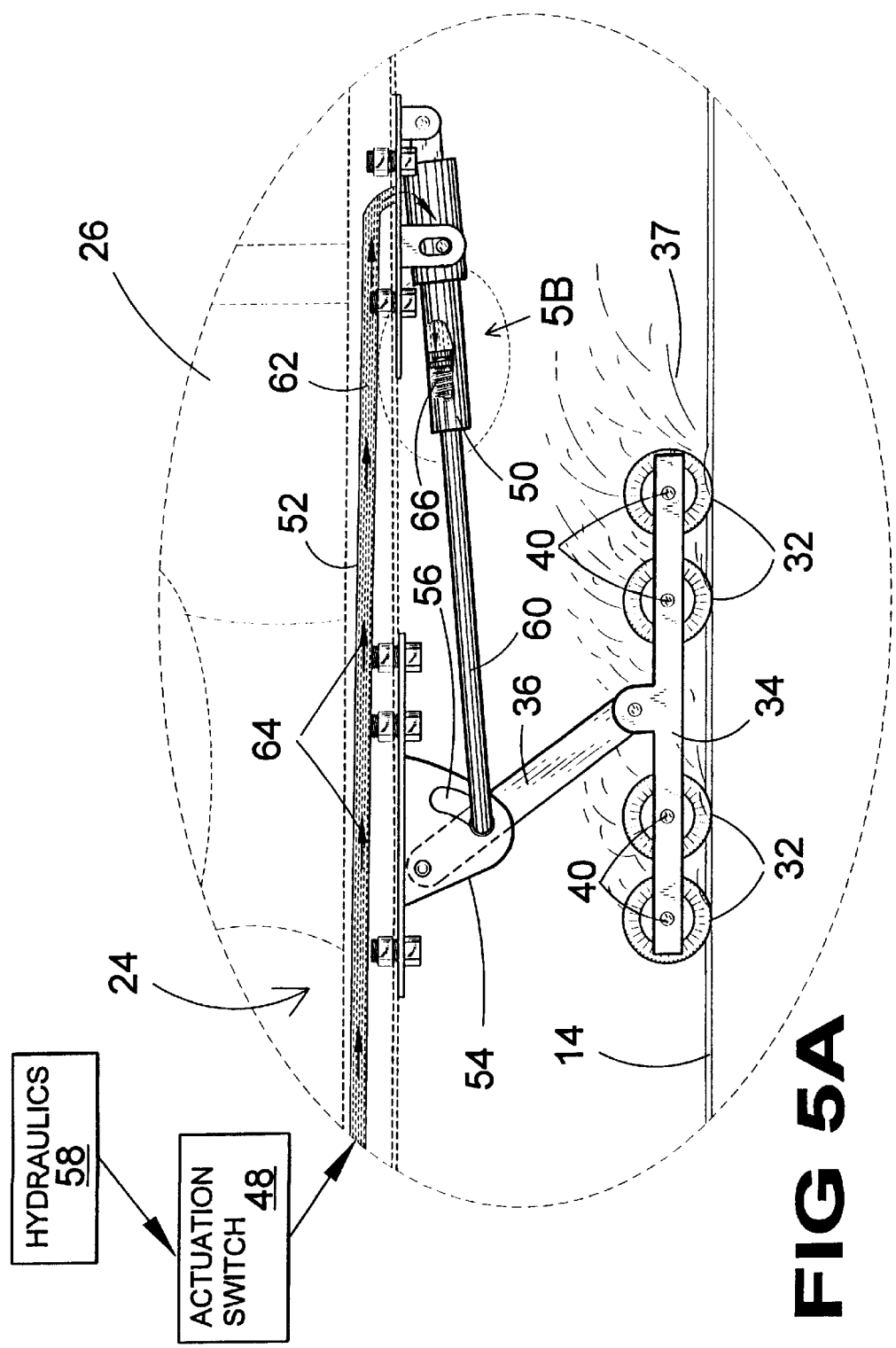

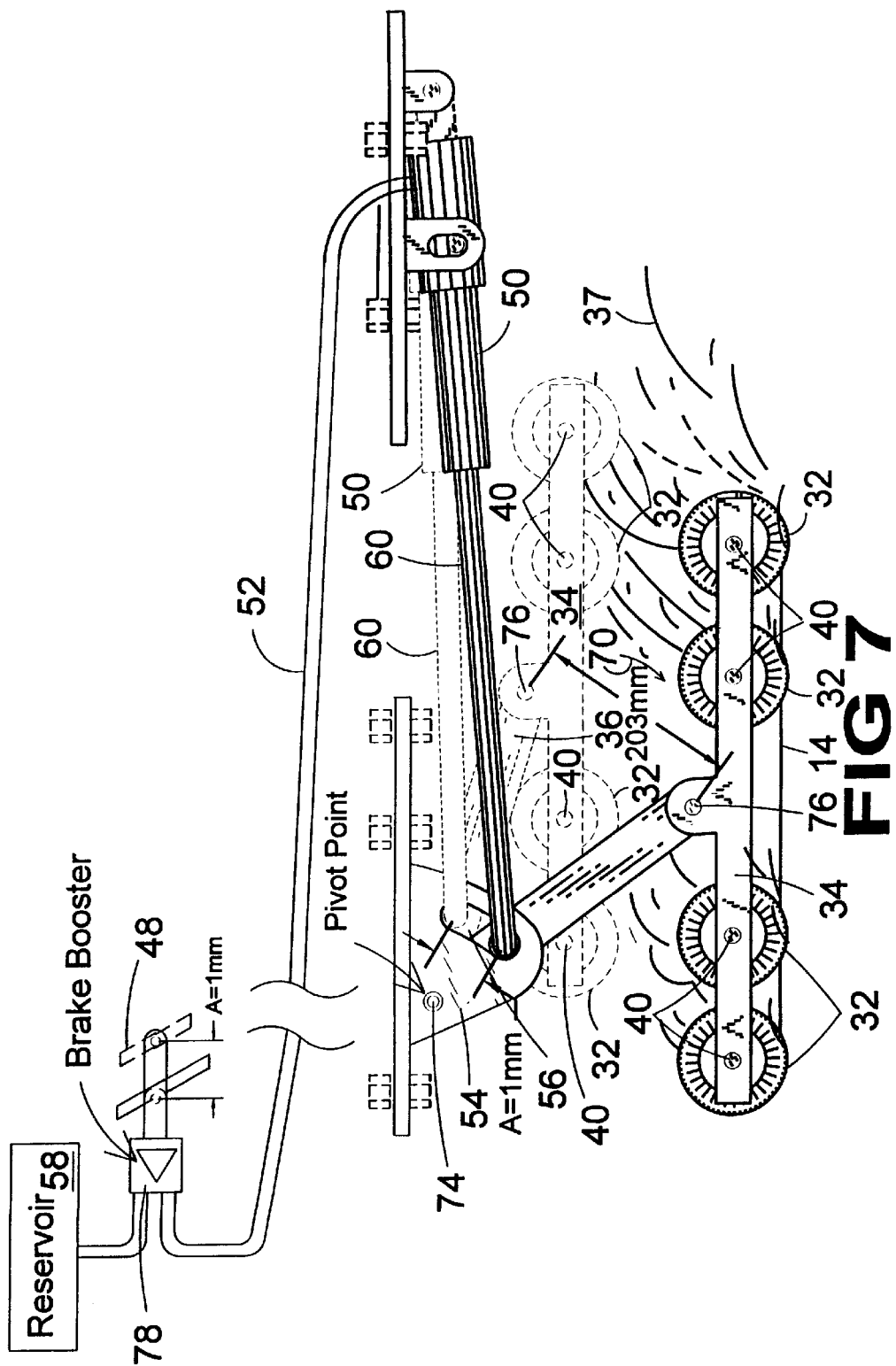

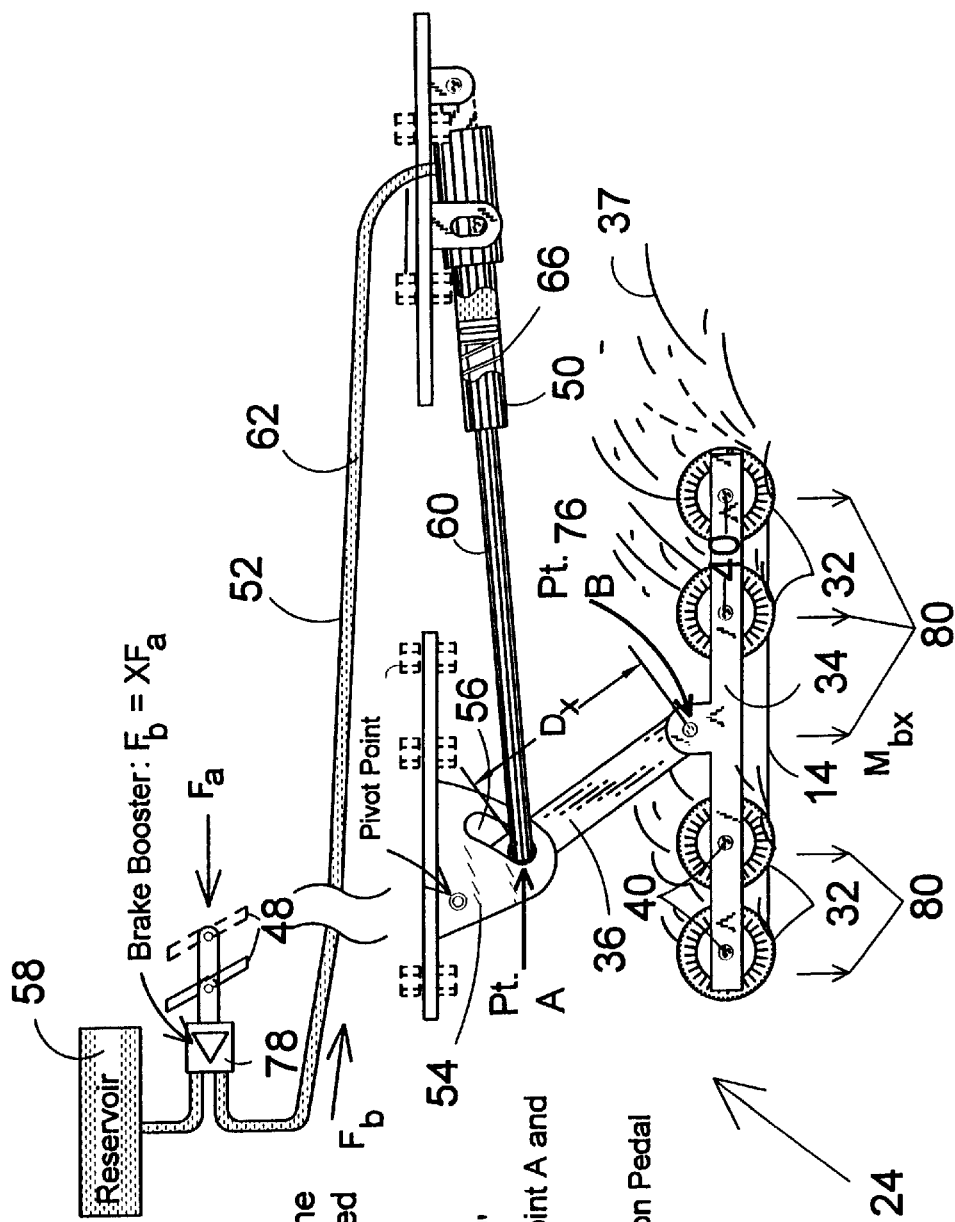

FIG 8 where "$F_b$" is the Fluid Force linearly increased by the Brake Booster where $D_x$ is the distance that the force $F_b$ is additionally increased by the moment arm.

where "$M_{bx}$" is the Force "$F_b$" multiplied by the Distance "$D_x$"

where $D_x$ = Distance between Point A and Point B where $F_a$ = Applied Braking Force on Pedal where $F_b = XF_a$ where X = variable scalar where $M_{bx} = F_b \times D_x$

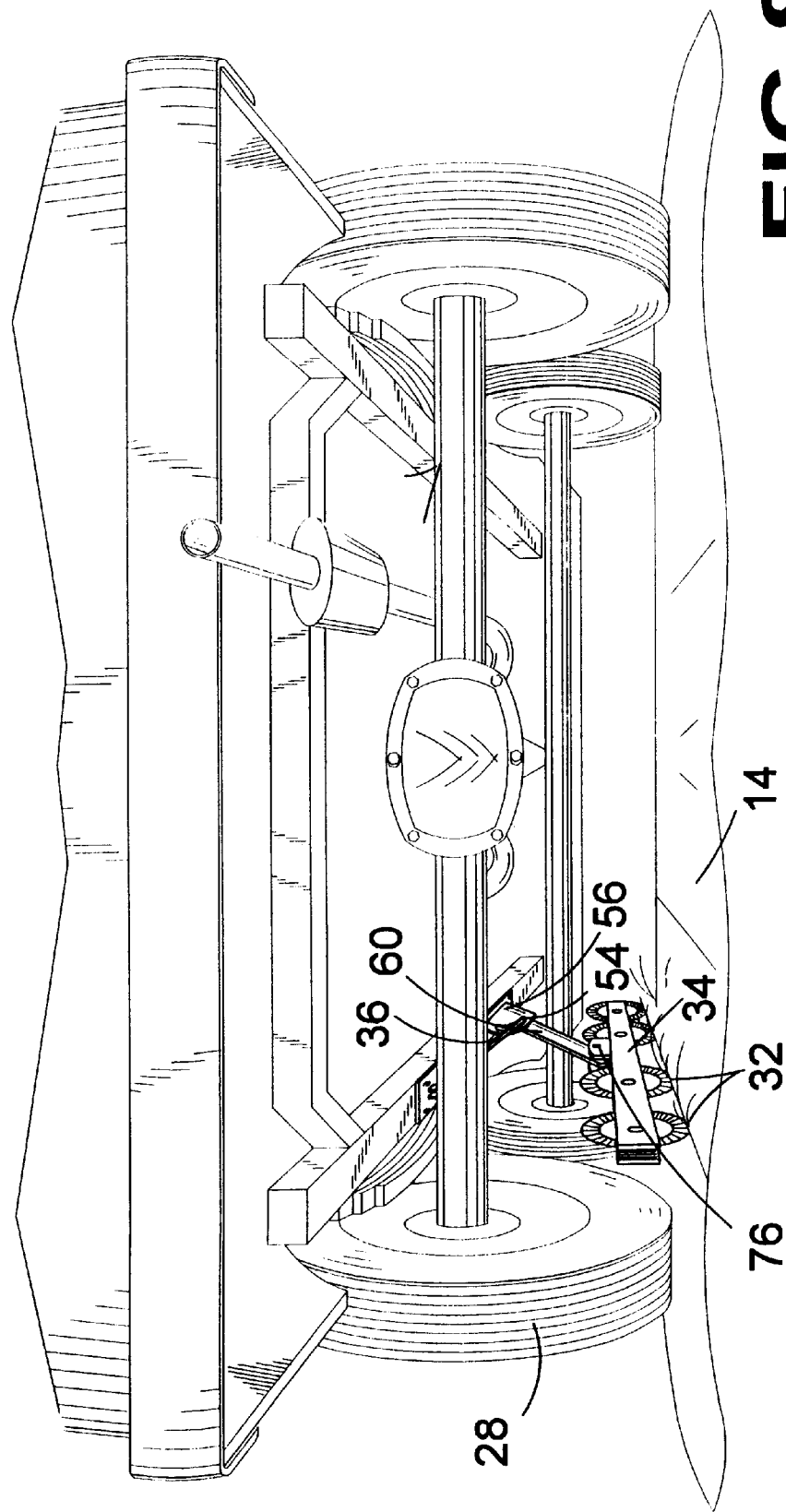

ANTI ICE SKIDDING APPARATUS

BACKGROUND OF THE INVENTION

1. Field of the Invention

The present invention relates generally to motor vehicle anti skid devices and, more specifically, to an apparatus attached to the undercarriage of a motor vehicle and activated by a user within the motor vehicle to extend until at least a portion thereof engages an icy surface whereby the apparatus will provide a resistance to lateral movement by the motor vehicle.

2. Description of the Prior Art

Numerous devices which modify the existing systems of steering, acceleration and especially braking, such as the anti locking braking system, for attempting to avoid the loss of control of a motor vehicle on wet and icy surfaces exist. These systems do not have the sole purpose of engaging upon entering hazardous icy portions of a roadway to resist lateral forces acting on a vehicle when on the icy surface which would normally cause the vehicle to skid and possibly spin.

A conventional motor vehicle 10 is illustrated in FIGS. 1 and 2 without an anti ice skidding apparatus as disclosed by the present invention. This vehicle 10 is traveling on a roadway 12 and is approaching a patch of ice 14. As can be seen from FIG. 2, when the motor vehicle 10 reaches and begins to travel over the patch of ice 14, the tires 16 lose a great deal of traction. While on this patch of ice, lateral forces as indicated by the dashed arrows labeled with the numeral 18 act thereon causing the vehicle 10 to skid and slide. The lateral forces 18 arc due to the limited amount of traction and cause the motor vehicle 10 to slide as indicated by the dashed outline of the motor vehicle indicated by the numeral 20. When a motor vehicle 10 is subject to and unable to resist these lateral forces the motor vehicle may slide off the roadway 12 and into objects such as trees 22 on the side of the roadway 12, slide into another motor vehicle sharing the roadway 12 or even spin out. Any of these situations may cause painful and possibly critical injuries to the occupants of the vehicle 12.

It is thus desirable to provide a device which may be attached to an undercarriage of a motor vehicle and is selectively deployed by the operator of the motor vehicle to provide a resistance to lateral movement of the vehicle. It is further desirable to provide a device which is able to control the direction of a motor vehicle while on an icy surface. It is still further desirable to provide a device which will not impede the momentum of the motor vehicle while resisting the lateral forces encountered while traveling on an icy surface. It is even further desirable to provide an anti ice skidding apparatus which is able to provide a breaking force for aiding the motor vehicle in braking on an icy surface.

SUMMARY OF THE PRESENT INVENTION

The present invention relates generally to motor vehicle anti skid devices and, more specifically, to an apparatus attached to the undercarriage of a motor vehicle and activated by a user within the motor vehicle to extend until at least a portion thereof engages an icy surface whereby the apparatus will provide a resistance to lateral movement by the motor vehicle.

A primary object of the present invention is to provide an anti ice skidding apparatus that will overcome the shortcomings of prior art devices.

A further object of the present invention is to provide an anti ice skidding apparatus able to be connected to an undercarriage of a motor vehicle and resist lateral forces without impeding the forward momentum of the vehicle.

Another object of the present invention is to provide an anti ice skidding apparatus able to be deployed for engagement with a surface on which the motor vehicle is traveling from within a motor vehicle.

A still further object of the present invention is to provide an anti ice skidding apparatus wherein the deployment device uses an actuator switch connected to a hydraulic piston.

A yet further object of the present invention is to provide an anti ice skidding apparatus wherein the hydraulic piston is connected to an extender for a chassis bearing shaft.

Another object of the present invention is to provide an anti ice skidding apparatus wherein the chassis includes a plurality of sharp edged discs arrayed in a serial alignment.

A still further object of the present invention is to provide an anti ice skidding apparatus wherein the chassis bearing shaft mounts astride the disc chassis.

A yet further object of the present invention is to provide an anti ice skidding apparatus having a vertically mounted hydraulic piston connected to the disc chassis and divergent vertically mounted chassis bearing shafts also connected to the disc chassis.

A still further object of the present invention is to provide an anti ice skidding apparatus having a blade which is hydraulically deployed and is used as a brake for a motor vehicle while on an icy surface.

Another object of the present invention is to provide an anti ice skidding apparatus that is simple and easy to use.

A still further object of the present invention is to provide an anti ice skidding apparatus that is economical in cost to manufacture.

Additional objects of the present invention will appear as the description proceeds.

An anti ice skidding apparatus for providing resistance to lateral forces acting on a vehicle is disclosed by the present invention. The anti ice skidding apparatus includes a disc chassis, a device for engaging a roadway pivotally connected to the disc chassis and a device for securing the disc chassis to an underside of the vehicle. A device is connected to the securing device for pivoting the securing device between a first position maintaining the disc chassis and engaging device at a distance above the roadway and a second position placing the engaging device in engagement with the roadway. The engaging device is able to engage the roadway and provide additional resistance to lateral forces acting on the vehicle when in the second position. The engaging device may be one of a plurality of rollers or a blade which will engage with icy surfaces on the roadway and cut a groove in the icy surface to provide additional resistance to the lateral forces acting on the vehicle. The plurality of rollers and the blade each include a sharp edge extending around a periphery thereof, the sharp edge acting to cut a groove on any icy or soft surfaces over which the vehicle passes when in the second engaged position.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

FIG. 5 is an enlarged view with parts cut away of the hydraulic piston of the anti ice skidding apparatus of the present invention;

FIG. 7 is a side view of the anti ice skidding apparatus of the present invention in the fully deployed operative position;

FIG. 8 is a side view of the anti ice skidding apparatus of the present invention illustrating a physical force (Fa) being applied to actuate the apparatus;

FIG. 9 is a rear undercarriage view of the motor vehicle including the anti ice skidding apparatus of the present invention installed thereon and in a fully extended position;

DESCRIPTION OF THE REFERENCED NUMERALS

Figure 1:
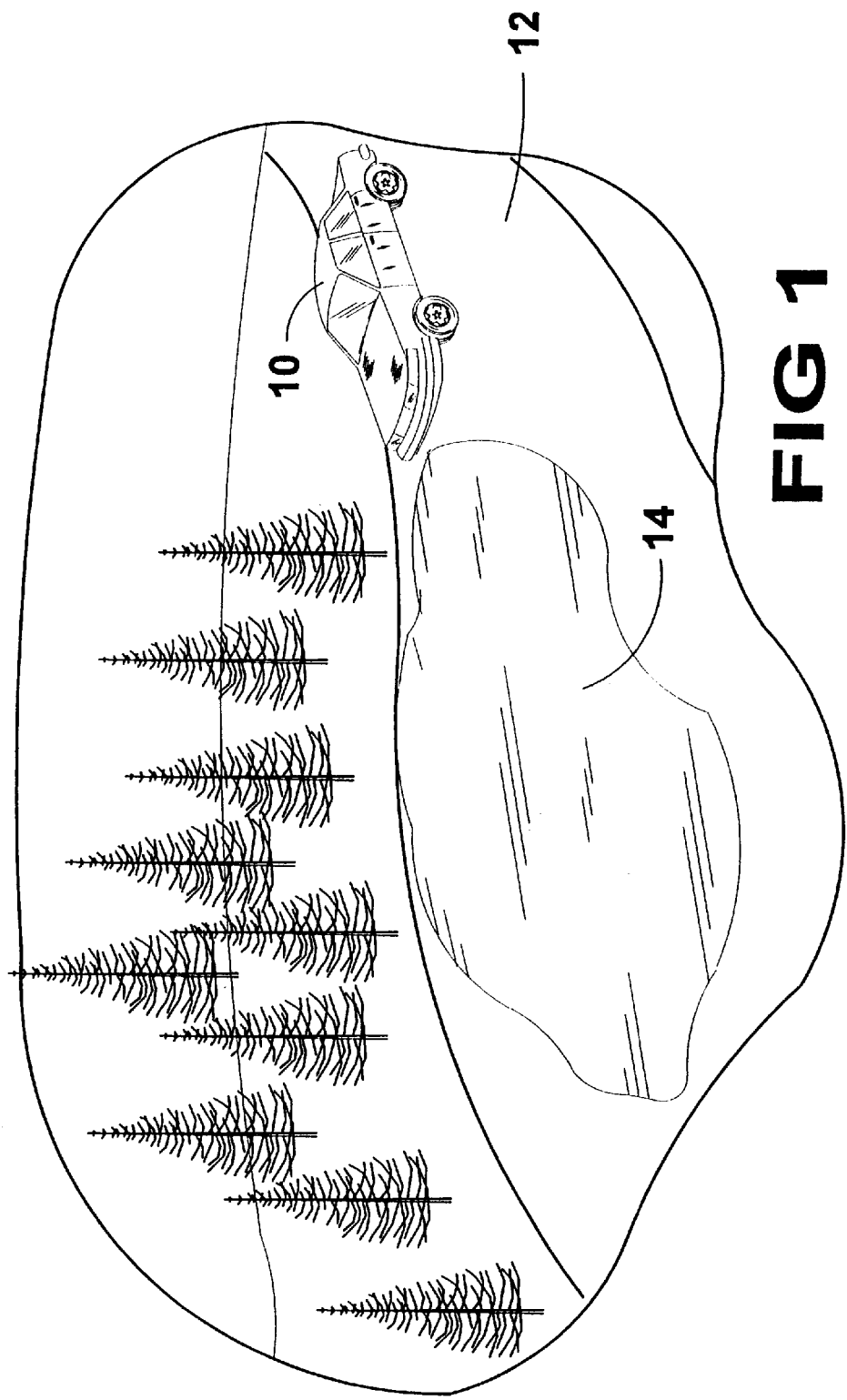
FIG. 1 is a perspective view of a conventional motor vehicle about to enter upon a sheet of ice whereupon the steering and braking systems of the vehicle will encounter difficulties with traction and breaking on the tractionless surface.
Figure 2:
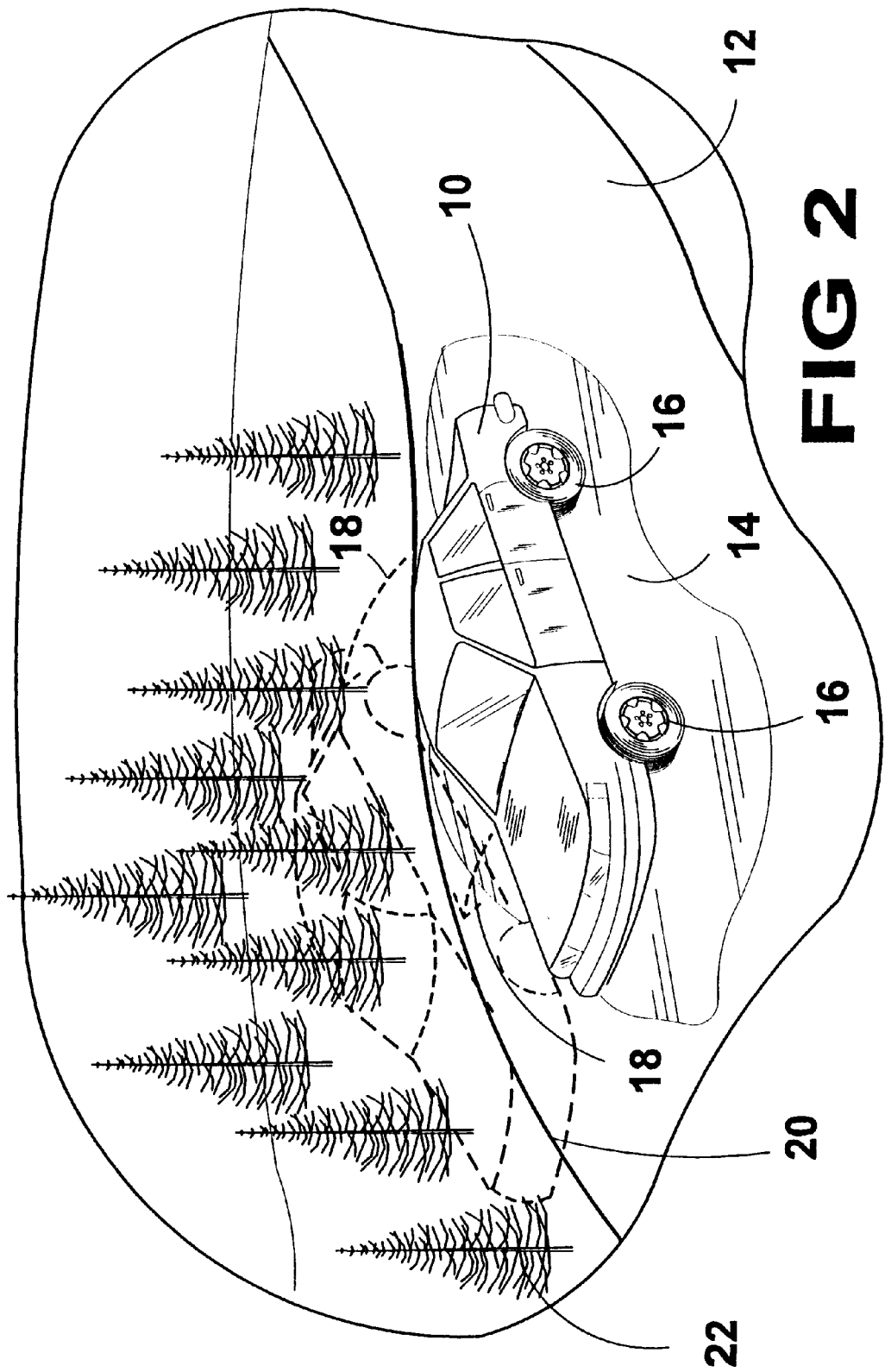
FIG. 2 is a perspective view of the vehicle shown in FIG. 1 traveling over the icy surface, a view of the vehicle skidding on the icy surface is shown in dashed lines.

Turning now descriptively to the drawings, in which similar reference characters denote similar elements throughout the several views, the Figures illustrate the anti ice skidding apparatus of the present invention. With regard to the reference numerals used, the following numbering is used throughout the various drawing figures.

| | |
|---|---|
| 10 | motor vehicle |
| 12 | roadway |
| 14 | patch of ice on roadway |
| 16 | tires of vehicle |
| 18 | arrows indicating lateral forces applied to vehicle |
| 20 | dashed outline of vehicle subject to lateral forces |
| 22 | object/trees on side of roadway |
| 24 | anti ice skidding apparatus of the present invention |
| 26 | motor vehicle to which anti ice skidding apparatus is attached |
| 28 | underside of motor vehicle |
| 30 | tires of motor vehicle |
| 32 | plurality of rollers |
| 33 | bearing pivotally connecting disc chassis and chassis bearing shaft |
| 34 | disc chassis |
| 35 | cut formed in ice by rollers |
| 36 | chassis bearing shaft |
| 37 | ice chips being displaced by rollers |
| 38 | arrow indicating pivoting of support structure |
| 40 | roller bearing |
| 42 | pair of rails forming disc chassis |
| 44 | arrow indicating rotation of rollers |
| 45 | cutting edge of roller |
| 46 | operator of vehicle |
| 48 | pedal for actuating apparatus |
| 50 | hydraulic piston |
| 52 | fluid line |
| 54 | support structure |
| 56 | recess extending through support structure |
| 58 | source of hydraulic fluid |
| 60 | piston rod |
| 62 | hydraulic fluid |
| 64 | arrows indicating flow of hydraulic fluid through fluid line |
| 66 | spring within piston |
| 68 | arrow indicating movement of apparatus from engaged to disengaged position |
| 70 | arrow indicating movement of apparatus from disengaged to engaged position |
| 72 | arrow indicating retraction of the piston |

-continued

| 74 | connection/pivot point between chassis bearing shaft and support structure |
| 76 | connection/pivot point between disc chassis and chassis bearing shaft |
| 78 | brake booster |
| 80 | arrows indicating moment on the rollers applied by the chassis bearing shaft |
| 82 | second embodiment of the chassis bearing shaft |
| 84 | axle connecting chassis bearing shaft to disc chassis |
| 86 | first tine of second embodiment of chassis bearing shaft |
| 88 | second tine of chassis bearing shaft |
| 90 | third embodiment of chassis bearing shaft |
| 92 | cylinders forming third embodiment of chassis bearing shaft |
| 94 | first piston |
| 95 | piston rod for first piston |
| 96 | second piston |
| 97 | piston rod for second piston |
| 98 | pivot point connecting first piston to vehicle |
| 100 | pivot point connecting second piston to vehicle |
| 102 | alternate embodiment of the anti ice skidding apparatus |
| 104 | blade |
| 106 | hydraulic connection |
| 108 | cable connection |
| 110 | cable |
| 112 | pulley |
| 114 | piston rod |
| 116 | hydraulic reservoir for anti ice skidding apparatus |
| 118 | brake system of vehicle |
| 120 | hydraulic reservoir for brake system |

DETAILED DESCRIPTION OF THE PREFERRED EMBODIMENT

Turning now descriptively to the drawings, in which similar reference characters denote similar elements throughout the several views, FIGS. 3 through 19 illustrate the anti ice skidding apparatus of the present invention indicated generally by the numeral 24.

Figure 3:
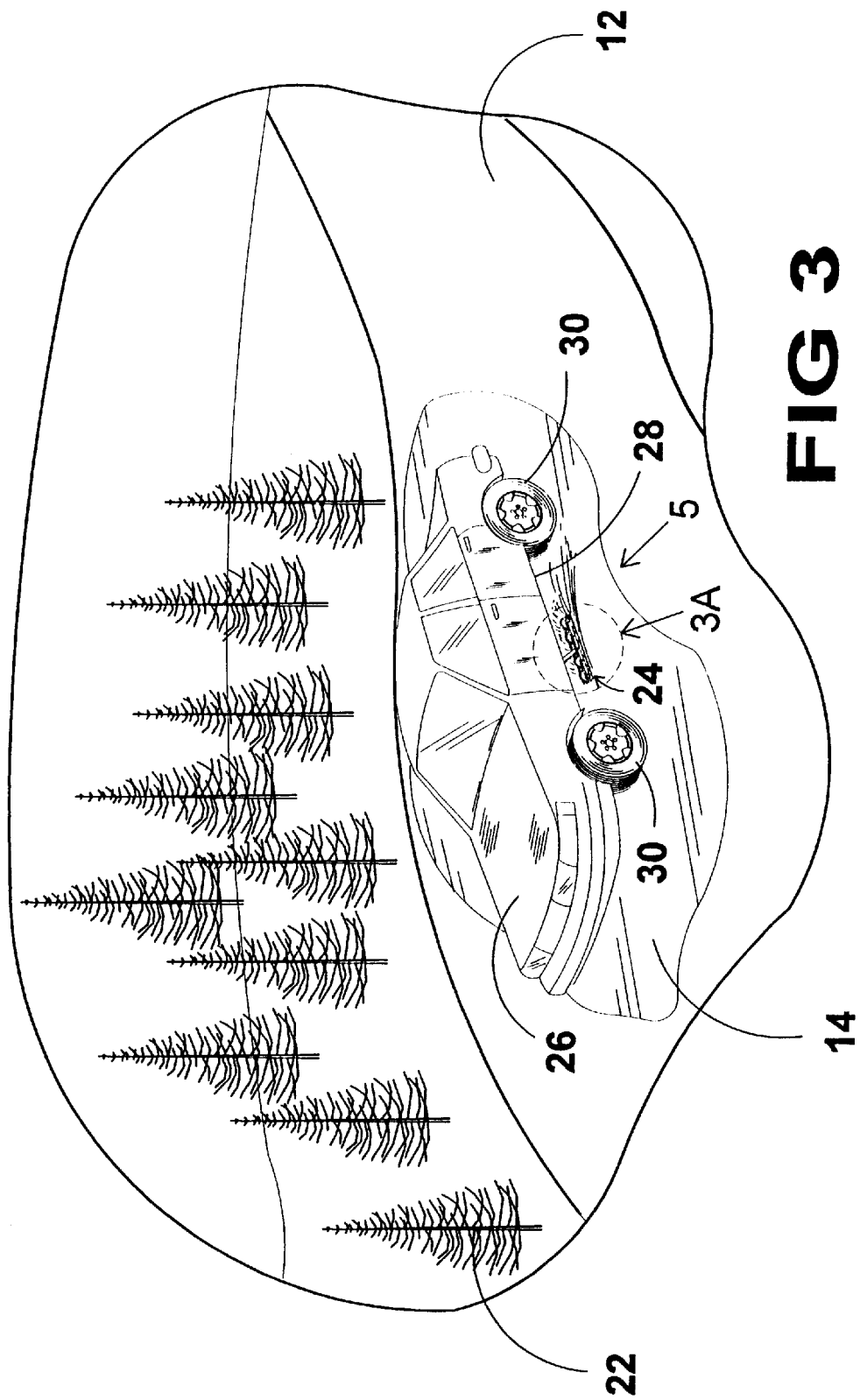
FIG. 3 is a perspective view of a vehicle including the anti ice skidding apparatus of the present invention installed thereon and engaged as the vehicle travels over a patch of ice on a road.
Figure 3A:
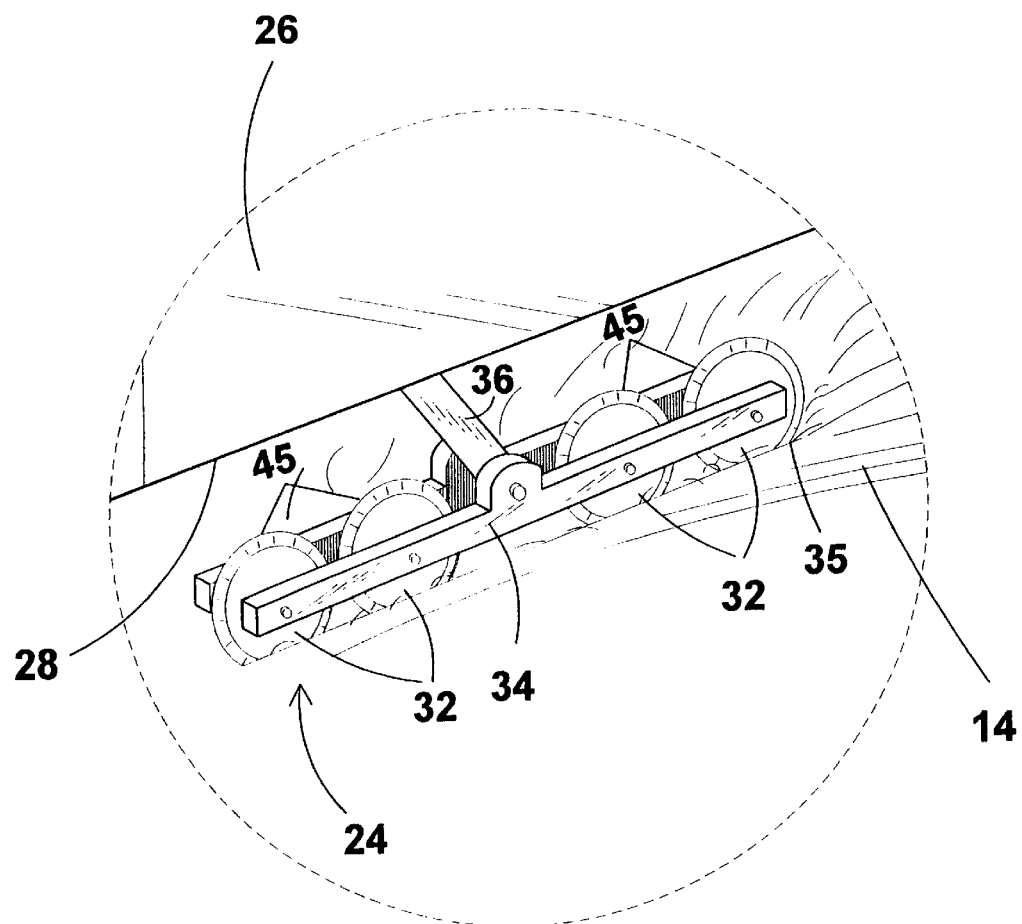
FIG. 3A is an enlarged view of the anti ice skidding apparatus of the present invention engaging a patch of ice taken from within the circle labeled 3A of FIG. 3.

The anti ice skidding apparatus 24 is illustrated in FIGS. 3 and 3A attached to a motor vehicle 26. The apparatus 24 is connected to an underside 28 and positioned between the tires 30 on either side of the vehicle 26. The apparatus 24 includes of a plurality of rollers 32 mounted to a disc chassis 34. A chassis bearing shaft 36 is connected to a central section of the disc chassis 34 for moving the plurality of rollers 32 between an activation position in which the rollers engage the roadway 12 or ice patch 14 and a deactivated position in which the rollers 32 are not engaged with the roadway 12 or ice patch 14. The apparatus 24 is illustrated in the activated position engaging the ice patch 14 as is shown by the cut 35 formed in the ice patch 14 and the ice chips 37 being displaced by the rollers 32.

Figure 4:
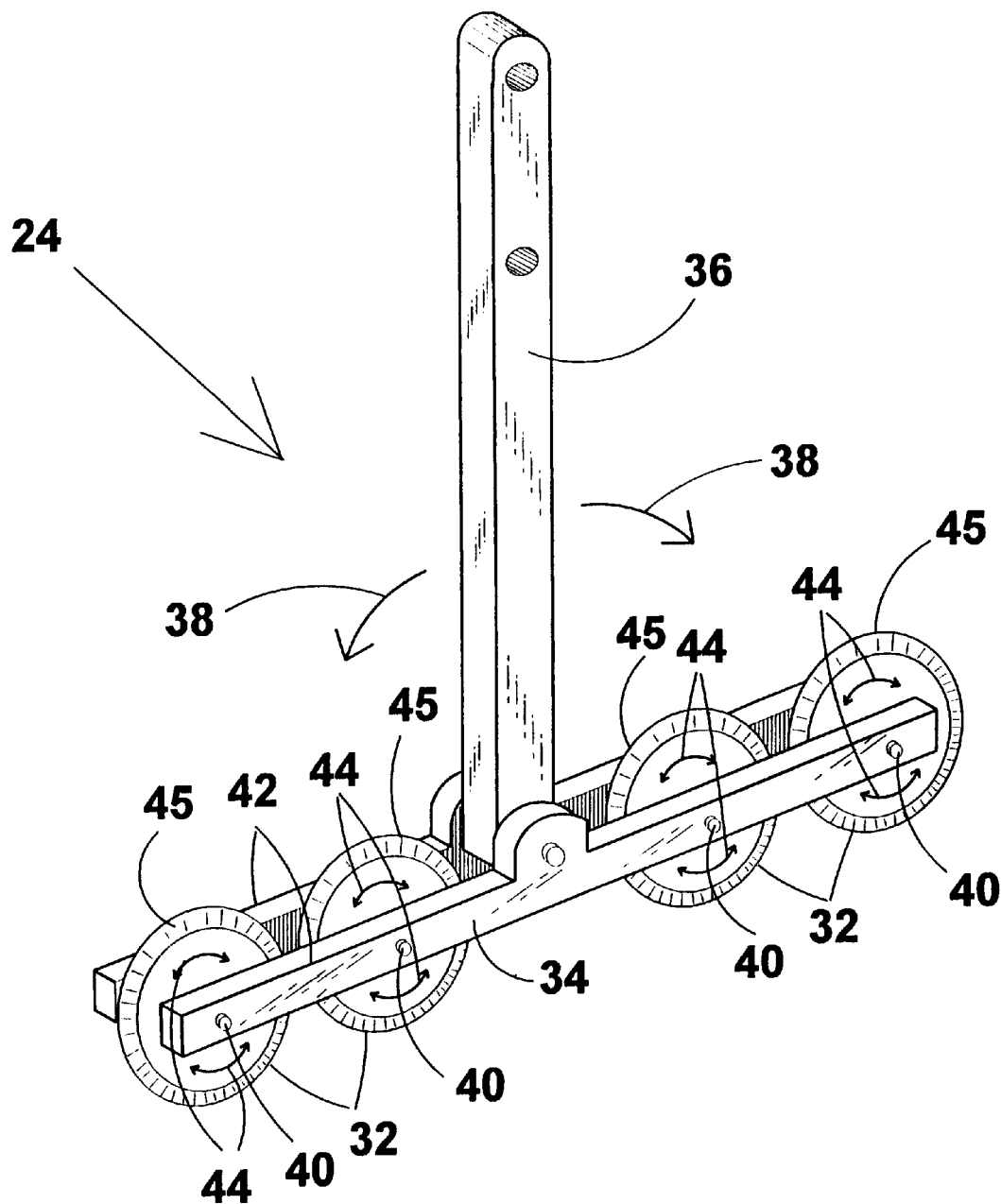
FIG. 4 is an enlarged view of the anti ice skidding apparatus of the present invention.

FIG. 4 illustrates a perspective view of the anti ice skidding apparatus 24 of the present invention. As can be seen from this figure, the chassis bearing shaft 36 is pivotally connected to the disc chassis 34 at a pivot point by a bearing 33. The pivotal nature of the connection is shown by the arrows indicating the pivoting of the chassis bearing shaft 36 labeled with the numeral 38. The disc chassis 34 includes a pair of opposed rails 42 having a plurality of fixedly positioned axles. Each of the plurality of rollers 32 are rotatably connected between the pair of rails 42 by a respective roller bearing 40. Each roller 32 is able to rotate about its respective roller bearing 40 as indicated by the arrows labeled with the numeral 44. Each of the plurality of rollers 32 has a cutting edge 45 located along a periphery thereof for cutting into the ice when the disc chassis 34 is extended by the chassis bearing shaft 36 into the engaged position.

FIG. 5 is a perspective view taken in the direction of the arrow labeled 5 in FIG. 3 and shows the vehicle 26 and a vehicle operator 46 in dashed lines. An enlarged view of the anti ice skidding apparatus 24 is shown in FIG. 5A taken from within the circle labeled with the numeral 5A in FIG. 5. Shown is the motor vehicle operator 46 engaging a pedal or actuation switch 48 for actuating an hydraulic piston 50. The hydraulic piston 50 is pivotally connected to the underside of the vehicle 26 and is actuated by the pedal 48 through a fluid line 52. A support structure 54 is secured to the undercarriage of the vehicle 26 and the chassis bearing shaft 36 is pivotally connected thereto. A recess 56 extends through the support structure 54 and a piston rod 60 of the hydraulic piston 50 extends therethrough and engages the chassis bearing shaft 36. The size of the recess 56 determines the range within which the chassis bearing shaft 36 is able to pivot. When the piston rod 60 is positioned at the base of the recess 56 as shown in FIG. 5A, the apparatus 24 will be in the activated position and the rollers 32 will engage the ice patch 14. The pedal 48 is connected between a source of hydraulic fluid 58 and the hydraulic piston 50. Upon engaging or applying pressure to the pedal 48, the source of hydraulic fluid 58 is connected to deliver hydraulic fluid through the fluid line 52 to the hydraulic piston 50. This causes the hydraulic piston rod 60 to be extended from the hydraulic piston 50 thereby moving the piston rod 60 along the length of the recess 56 to the base of the recess 56 and pivoting the chassis bearing shaft 36 towards the roadway 12. The chassis bearing shaft 36 carries the disc chassis 34 and rollers 32 towards the roadway 12 as it pivots to place the rollers 32 into engagement with the roadway 12 or ice patch 14. The flow of hydraulic fluid 62 through the fluid line 52 is shown by the arrows labeled with the numeral 64.

Figure 5B:
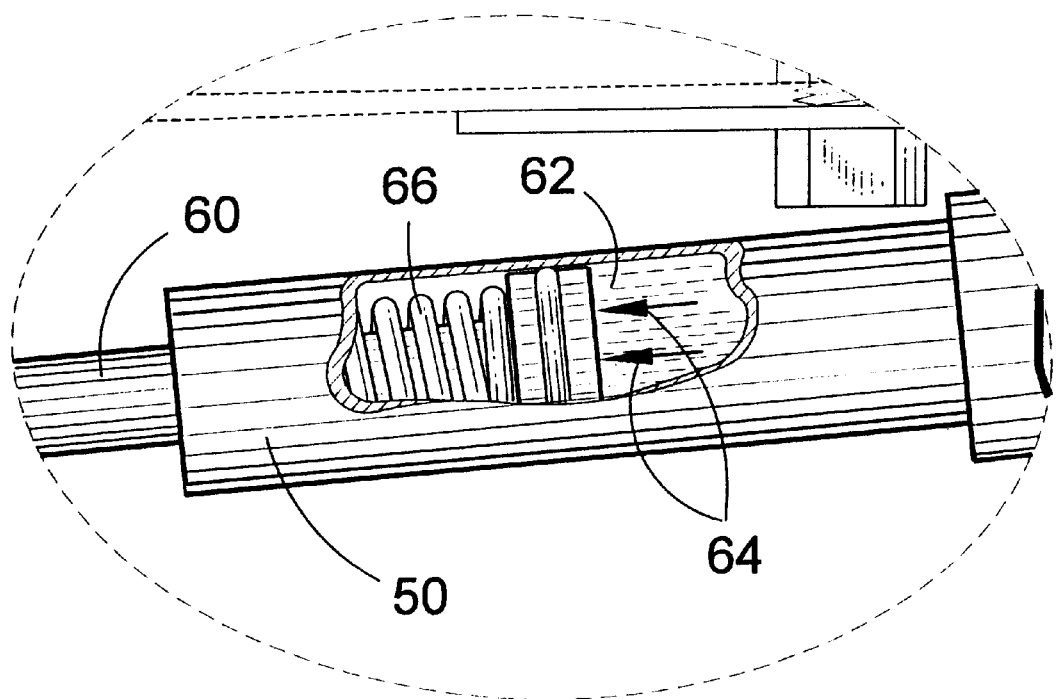
FIG. 5 is a side view of a motor vehicle with the anti ice skidding apparatus of the present invention installed thereon, the vehicle being illustrated in dashed lines to show an operator of the vehicle activating the anti ice skidding apparatus.
FIG. 5A is an enlarged view of the anti ice skidding apparatus of the present invention taken from within the circle labeled 5A of FIG. 5.
Figure 6:
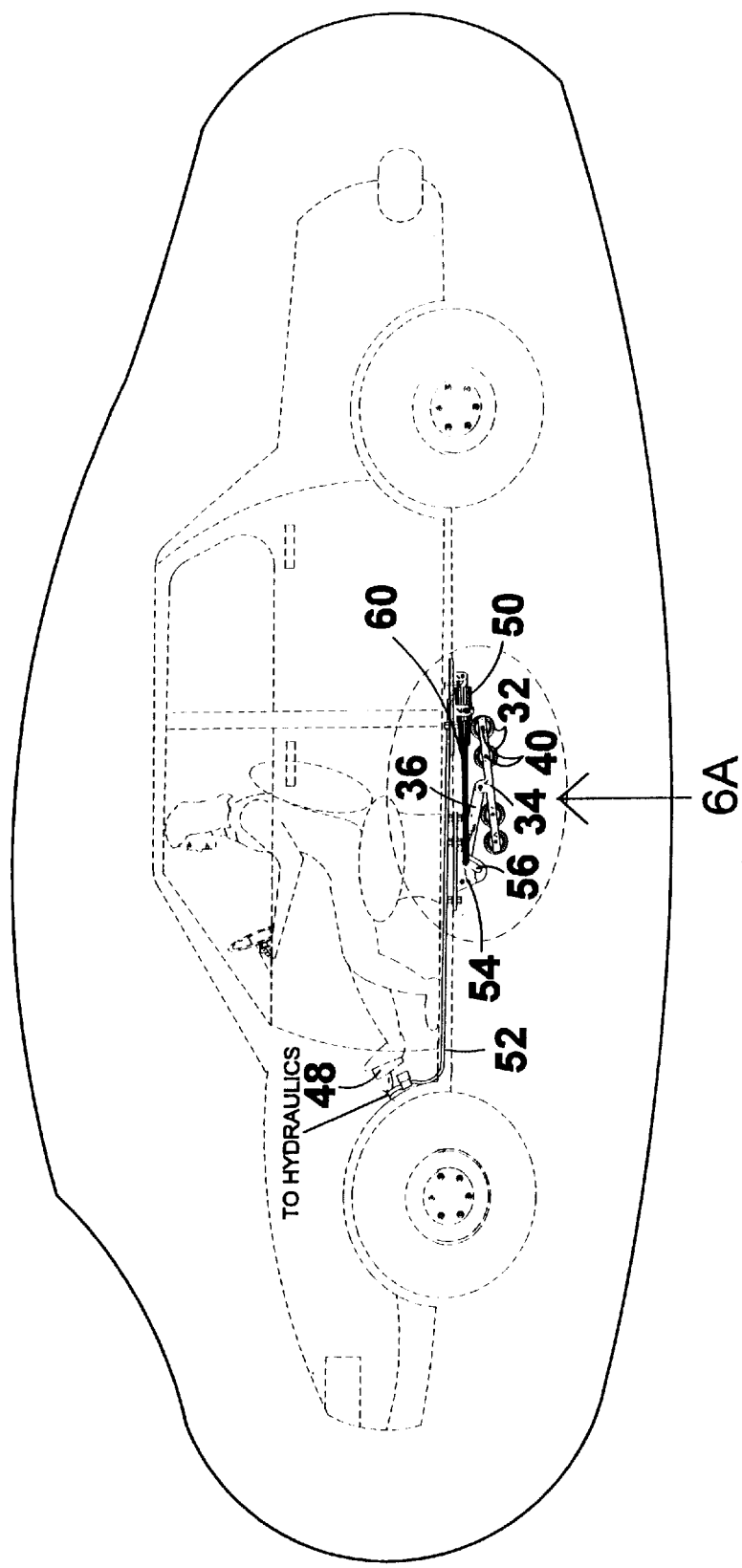
FIG. 6 is a side view of a motor vehicle with the anti ice skidding apparatus of the present invention installed thereon in a disengaged position.

An enlarged view with parts cut away of the inside of the hydraulic piston 50 is shown in FIG. 5B. This figure shows the flow of hydraulic fluid against the piston rod 60. The piston rod 60 includes a spring 66 therein whereby upon removal of the pressure supplied by the hydraulic fluid 62, such as when the operator 46 removes pressure from the pedal 48, the piston rod 60 will be caused to retract back into the hydraulic piston 50 moving the apparatus 24 into a disengaged position as illustrated in FIG. 6.

Figure 6A:
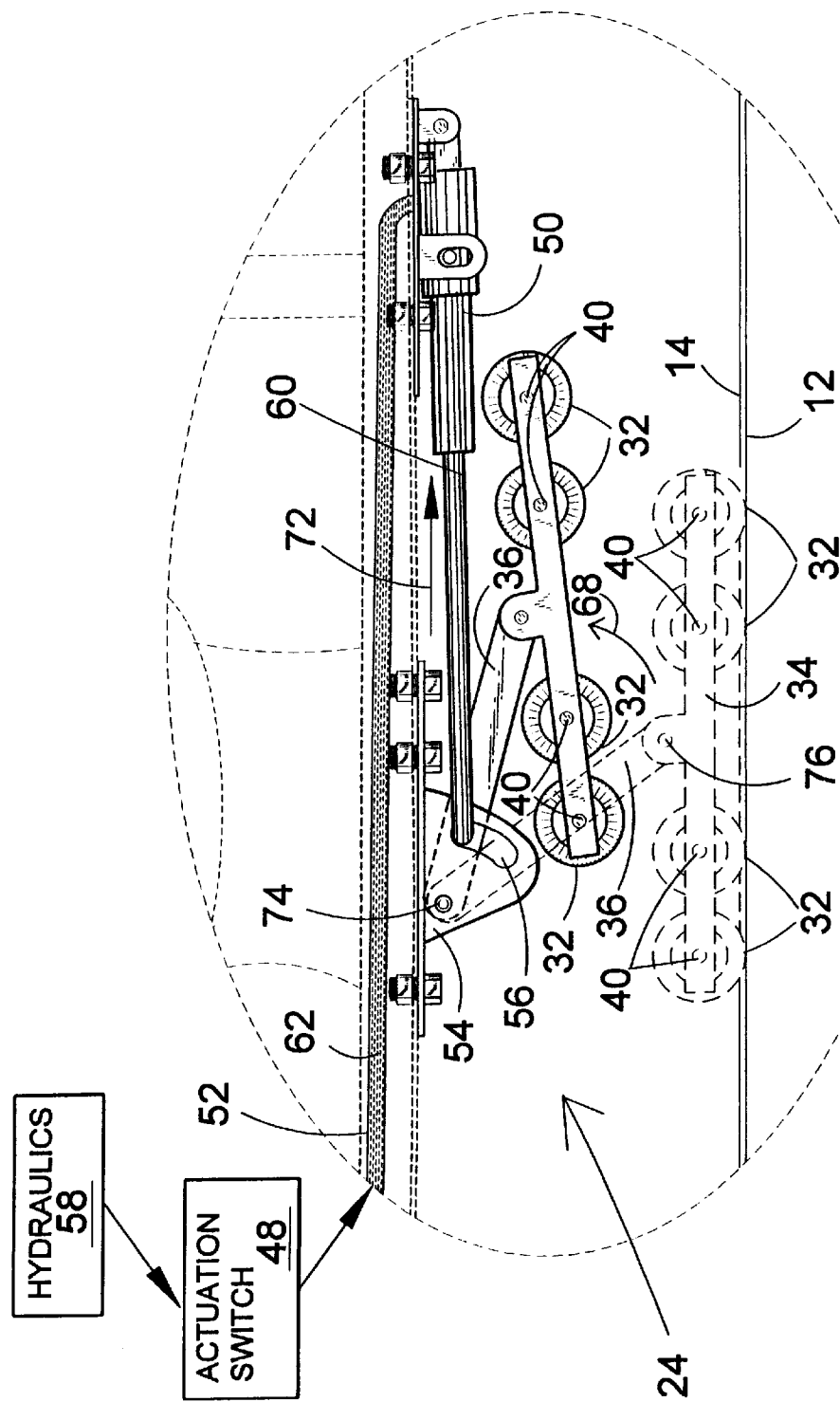
FIG. 6A is an enlarged view of the anti ice skidding apparatus of the present invention taken from within the circle labeled 6A of FIG. 6, the anti ice skidding apparatus is shown in the engaged position by dashed lines.

An enlarged view of the apparatus 24 is illustrated in FIGS. 6A and 7 showing the movement between the engaged and disengaged positions. The engaged position is shown in dashed lines in FIG. 6A and the disengaged position is shown in dashed lines in FIG. 7. An arrow indicating the pivoting of the chassis bearing shaft 36 from the engaged position to the disengaged position is indicated by the numeral 68. An arrow indicating the pivoting of the chassis bearing shaft 36 from the disengaged position to the engaged position is indicated by the numeral 70. As indicated by the arrow labeled with the numeral 72 in FIG. 6A, when the apparatus moves from the engaged position to the disengaged position the piston rod 60 is retracted back into the piston 50 riding along the length of the recess 56 until it reaches the top of the recess 56. As the piston rod 60 retracts the chassis bearing shaft 36 is carried with it, pivoting about the connection point 74 with the support structure 54 in a direction towards the vehicle 26. As the chassis bearing shaft 36 pivots in this direction, the disc chassis 34 is caused to pivot about its connection point 76 with the chassis bearing shaft 36 as it rises above the roadway 12 carrying the rollers 32 therewith.

FIG. 7 illustrates movement of the apparatus 24 in the opposite direction as FIG. 6A, from the disengaged position to the engaged position. When a pressure is applied to the pedal 48 the brake booster 78 is caused to close thereby providing a flow path for the hydraulic fluid in the reservoir 58. The hydraulic fluid flows through the flow line 52 and into the piston 50 exerting a force against the piston rod 60 and causing the piston rod 60 to extend further from the piston 50. As the piston rod 60 is extended from the piston 50 it rides from the top to the bottom of the recess 56. This causes the chassis bearing shaft 36 connected to the piston rod 60 to pivot about the pivot point 74 towards the roadway and ice patch 14. As the chassis bearing shaft 36 pivots, the disc chassis 34 is also caused to pivot about the pivot point 76 towards the roadway and ice patch 14. The rollers 32 are carried with the disc chassis 34 until they contact the roadway 12. At this point the apparatus 24 is in the engaged position and the pivoting of the chassis bearing shaft 36 and disc chassis 34 ceases. As indicated in the figure, the length of the recess 56 and thus the maximum distance traveled by the chassis bearing shaft 36 at the connection to the piston rod 60 is preferably about 1 mm. As the chassis bearing shaft 36 is caused to move through the length of the recess 56, the disc chassis 34 is caused to pivot a distance of substantially 203 mm, about the pivot point 76 from its at rest disengaged position to its engaged position.

The interaction of forces within the apparatus 24 is illustrated in FIG. 8. As the force $F_a$ applied to the pedal or actuation switch 48 is increased, the actuation switch 48 acts upon the hydraulic pressure booster 78 to linearly (Fb=XFa) and incrementally increase the force $F_b$ of the hydraulic fluid 62 flowing through the fluid line 52. The fluid then acts on the hydraulic piston 50 with a force $F_b$ causing the piston rod 60 to be displaced and extend further therefrom. The piston rod 60 is pivotally connected to the chassis bearing shaft 36 which is of length $D_x$. The chassis bearing shaft 36 is pivotally connected to the support structure 54 at one end and to the disc chassis 34 at the other end. As the piston rod 60 is displaced, the chassis bearing shaft 36 is caused to pivot about the connection point 74. Force $F_b$ is further increased by the chassis bearing shaft which is of length $D_x$, resulting in the moment $M_{bx}$ ($M_{bx}$=force $F_b$×length $D_x$) on the rollers 32 towards the roadway 12 as indicated by the arrows labeled with the numeral 80.

A view of the apparatus 24 in the engaged position is shown in FIG. 9 from a back underside of the vehicle 26. From this view, the piston rod 60 is shown at a bottom side of the recess 56 thereby fully extending the chassis bearing shaft 36 towards the roadway 12. The rollers 32 are positioned in engagement with the ice patch 14 to provide resistance from any lateral forces on the vehicle 26 thereby preventing the vehicle from sliding to either side while the apparatus 24 is engaged.

Figure 10:
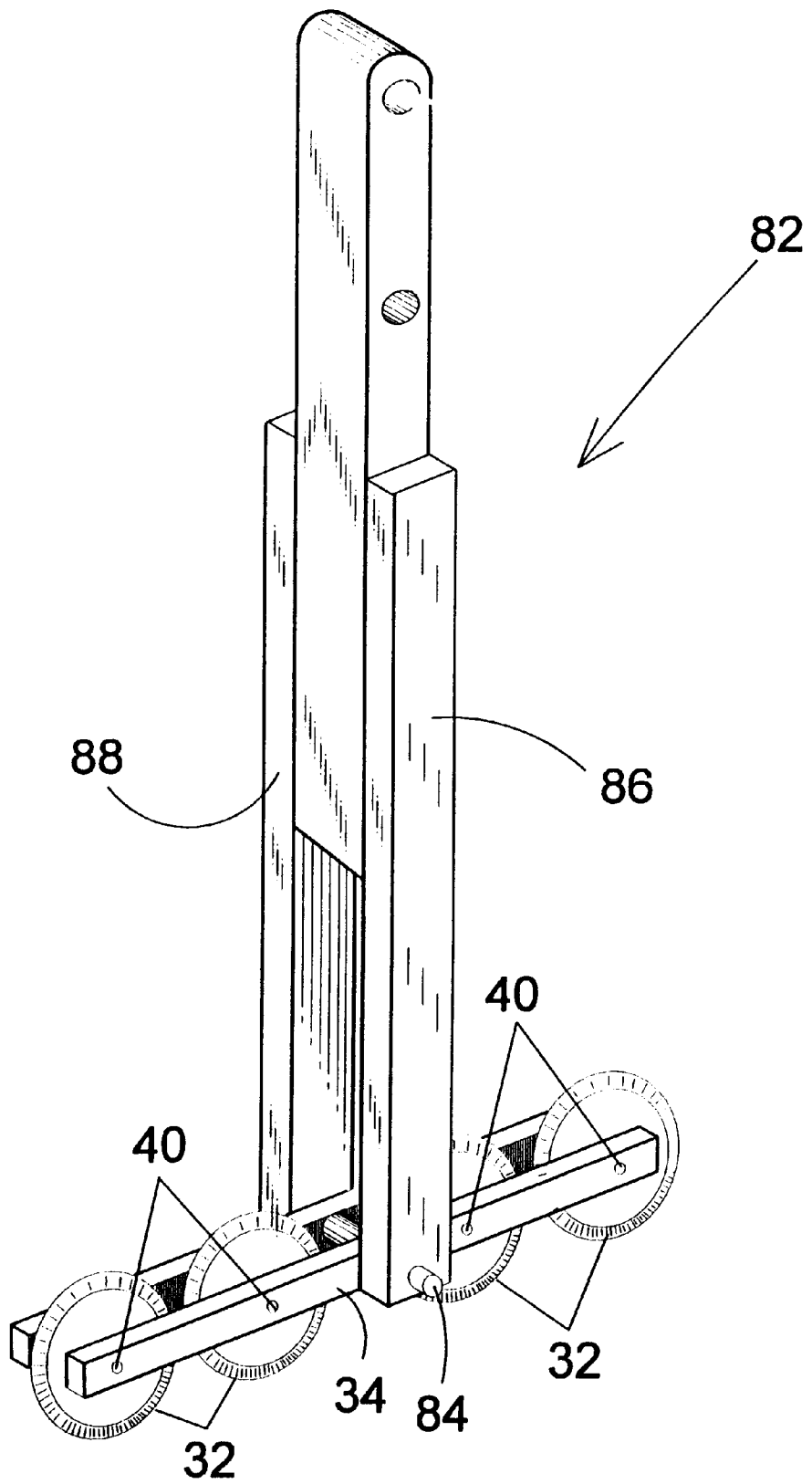
FIG. 10 is a perspective view of a second embodiment of the chassis bearing shaft for the anti ice skidding apparatus of the present invention.
Figure 11:
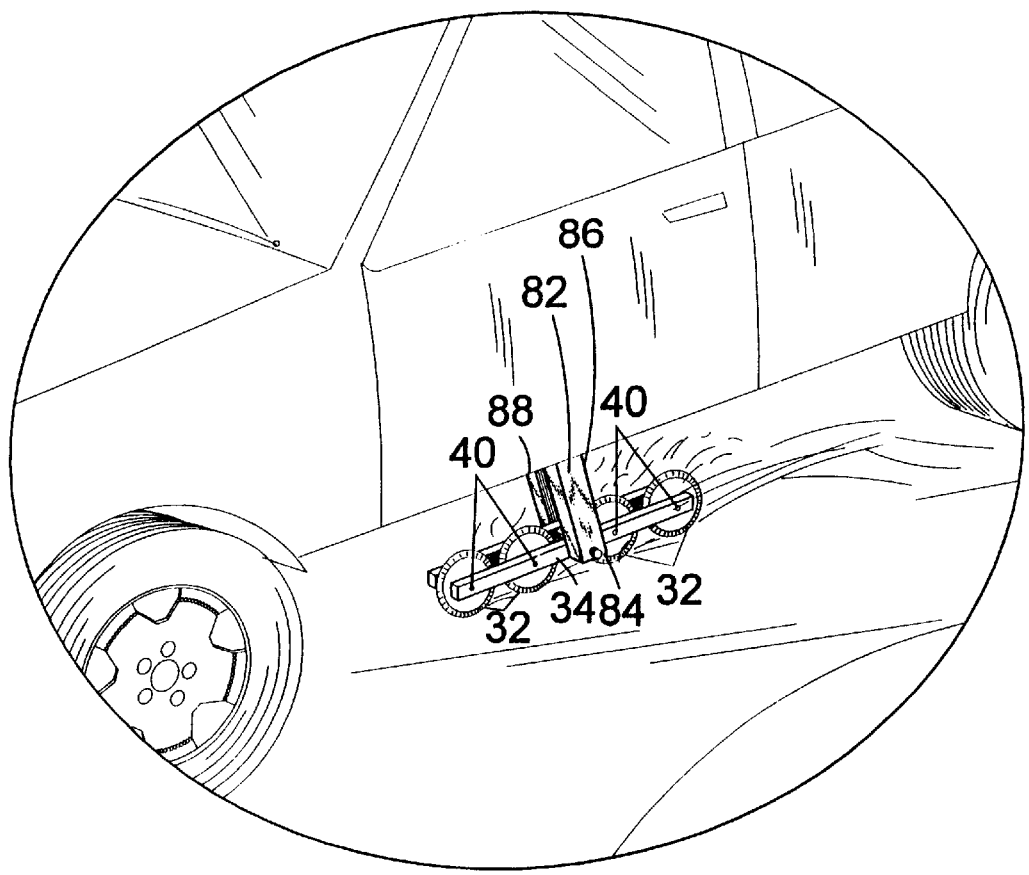
FIG. 11 is an enlarged perspective view of the second embodiment of the anti ice skidding apparatus of the present invention installed on a vehicle and in the engaged position.
Figure 12:
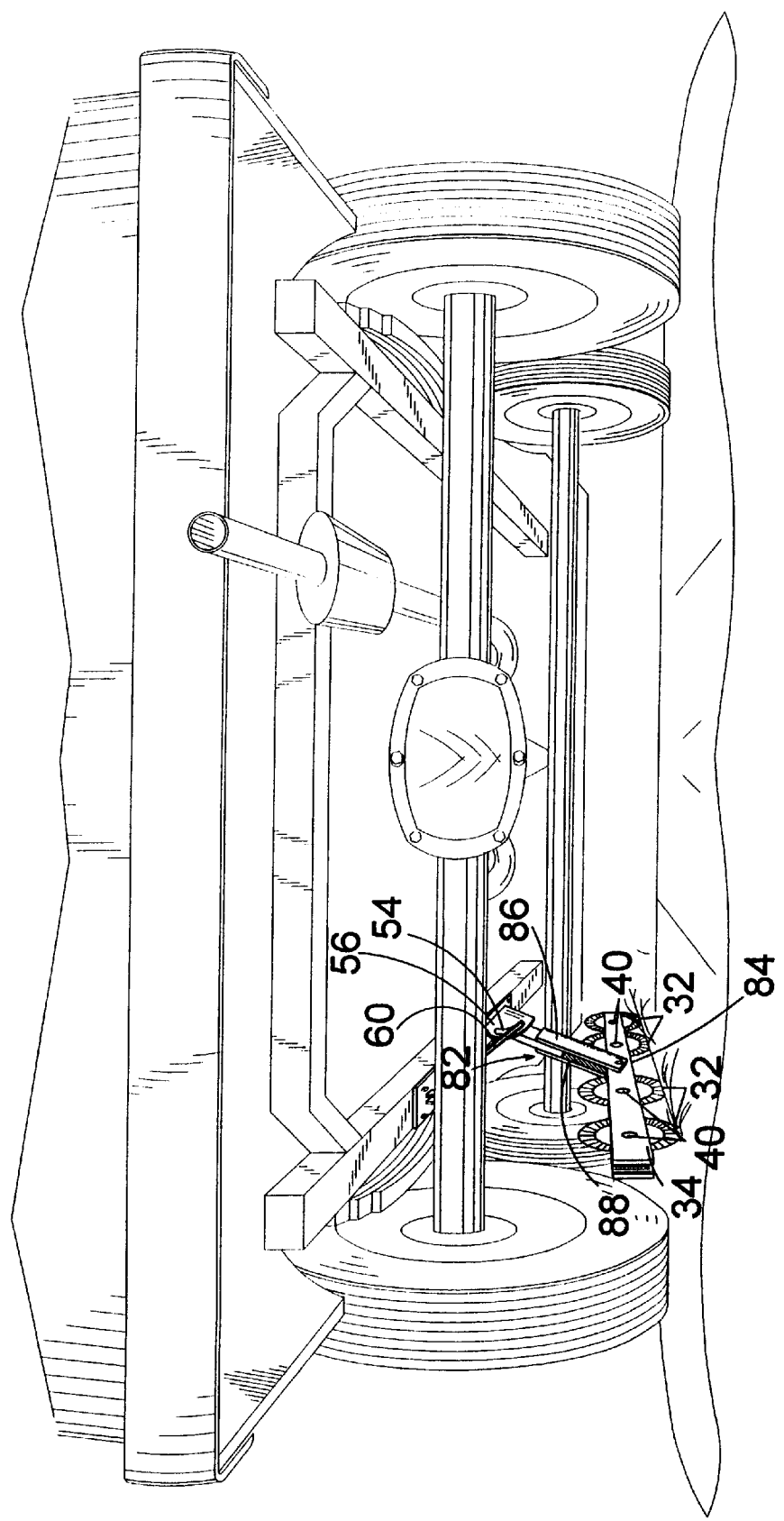
FIG. 12 is a rear undercarriage view of a motor vehicle including the second embodiment of the anti ice skidding apparatus of the present invention installed thereon.

FIGS. 10, 11 and 12 illustrate the anti ice skidding apparatus 24 including an alternate embodiment for the chassis bearing shaft 82. The alternate embodiment of the chassis bearing shaft 82 is forked and includes a first tine 86 and a second tine 88. The first and second tines 86 and 88, respectively, are connected on either side of the pair of rails 42 forming the disc chassis 34 by an axle 84. The forked chassis bearing shaft 82 is connected in a central location along the length of the disc chassis 34. The chassis bearing shaft 82 includes an end for mounting the hydraulic piston opposite the connection to the disc chassis 34 and to the support structure 54 fixedly attached to the undercarriage of the motor vehicle 26.

Figure 13:
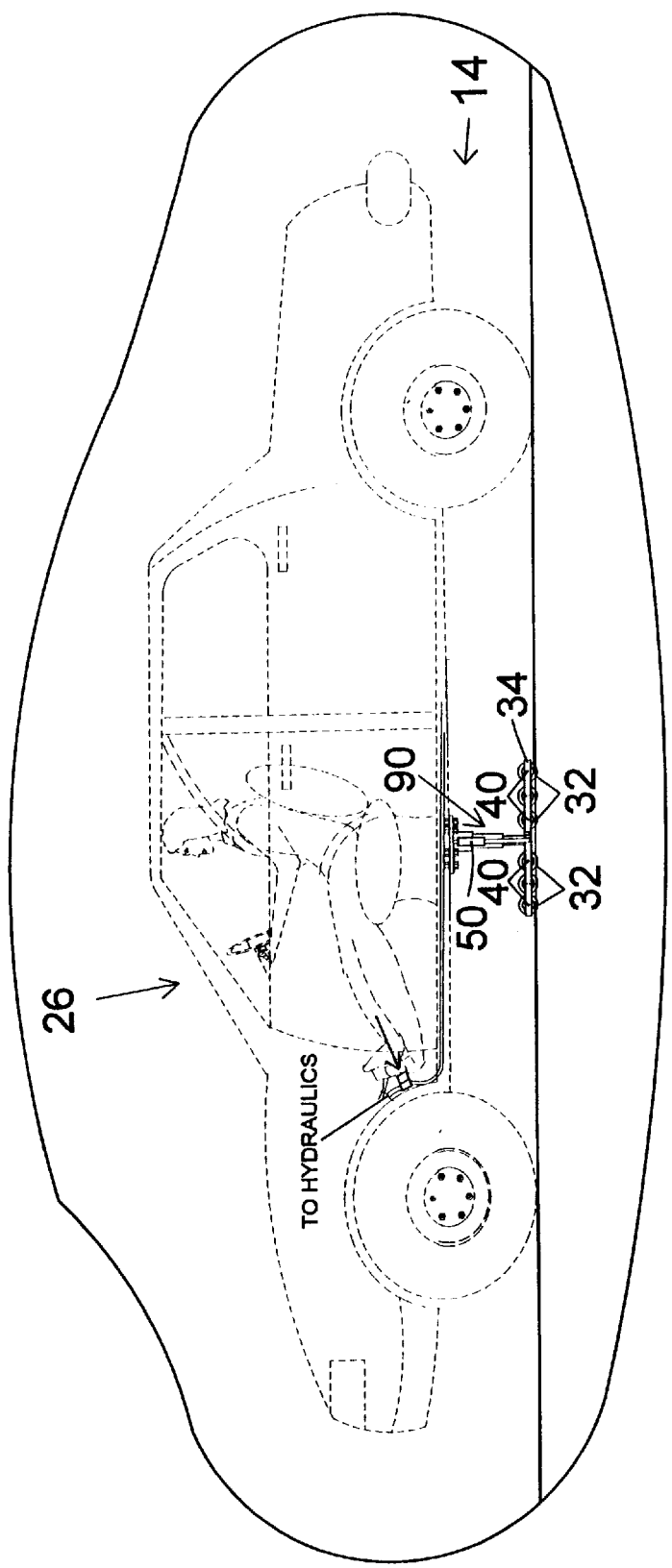
FIG. 13 is a side view of a motor vehicle including the second embodiment of the anti ice skidding apparatus of the present invention installed thereon, the vehicle being illustrated in dashed lines to show an operator of the vehicle activating the anti ice skidding apparatus.
Figure 14:
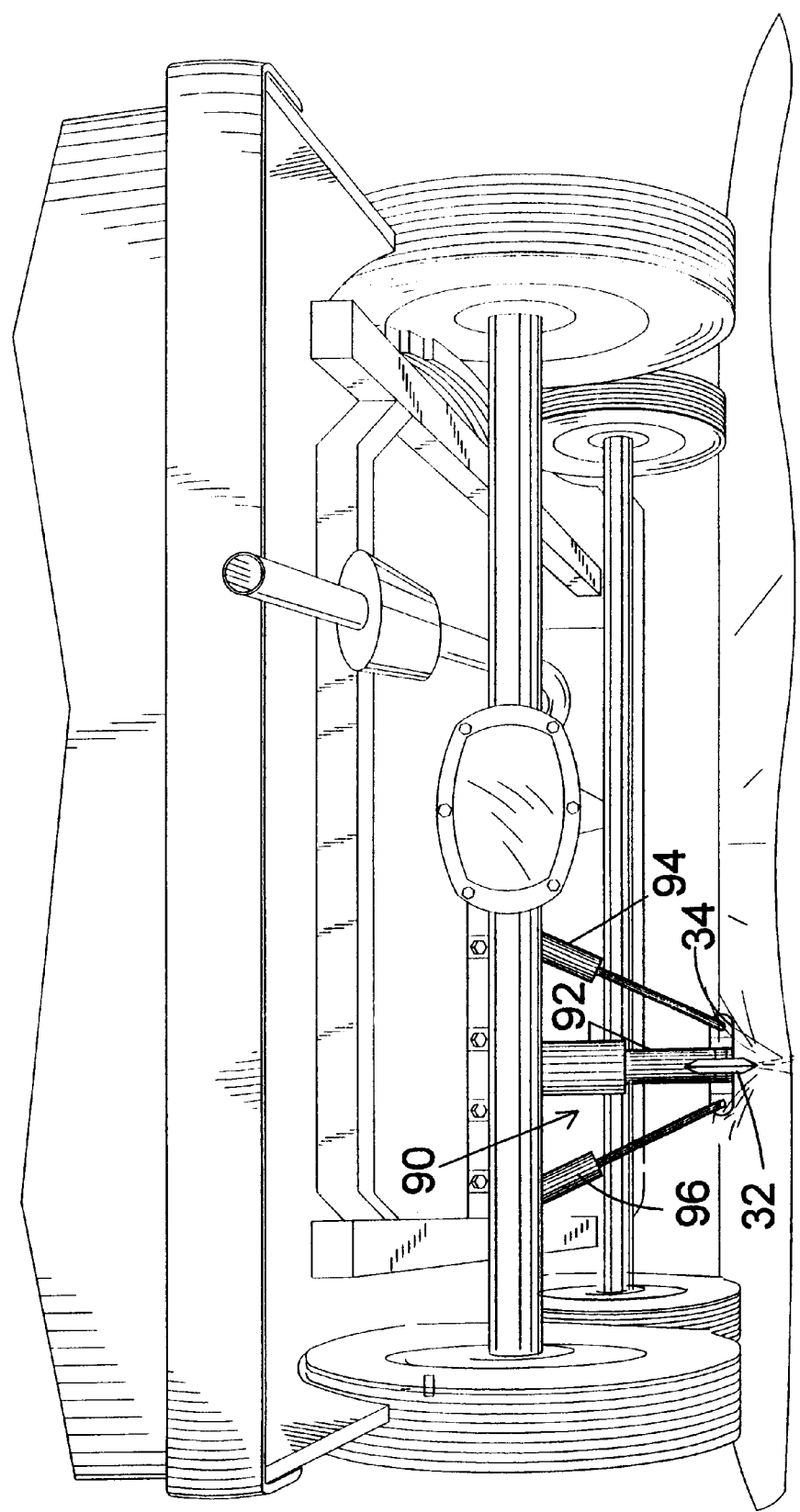
FIG. 14 is a rear undercarriage view of a third embodiment of the anti ice skidding apparatus of the present invention having two pivotal divergent chassis bearing shafts connected to the disc chassis.
Figure 15:
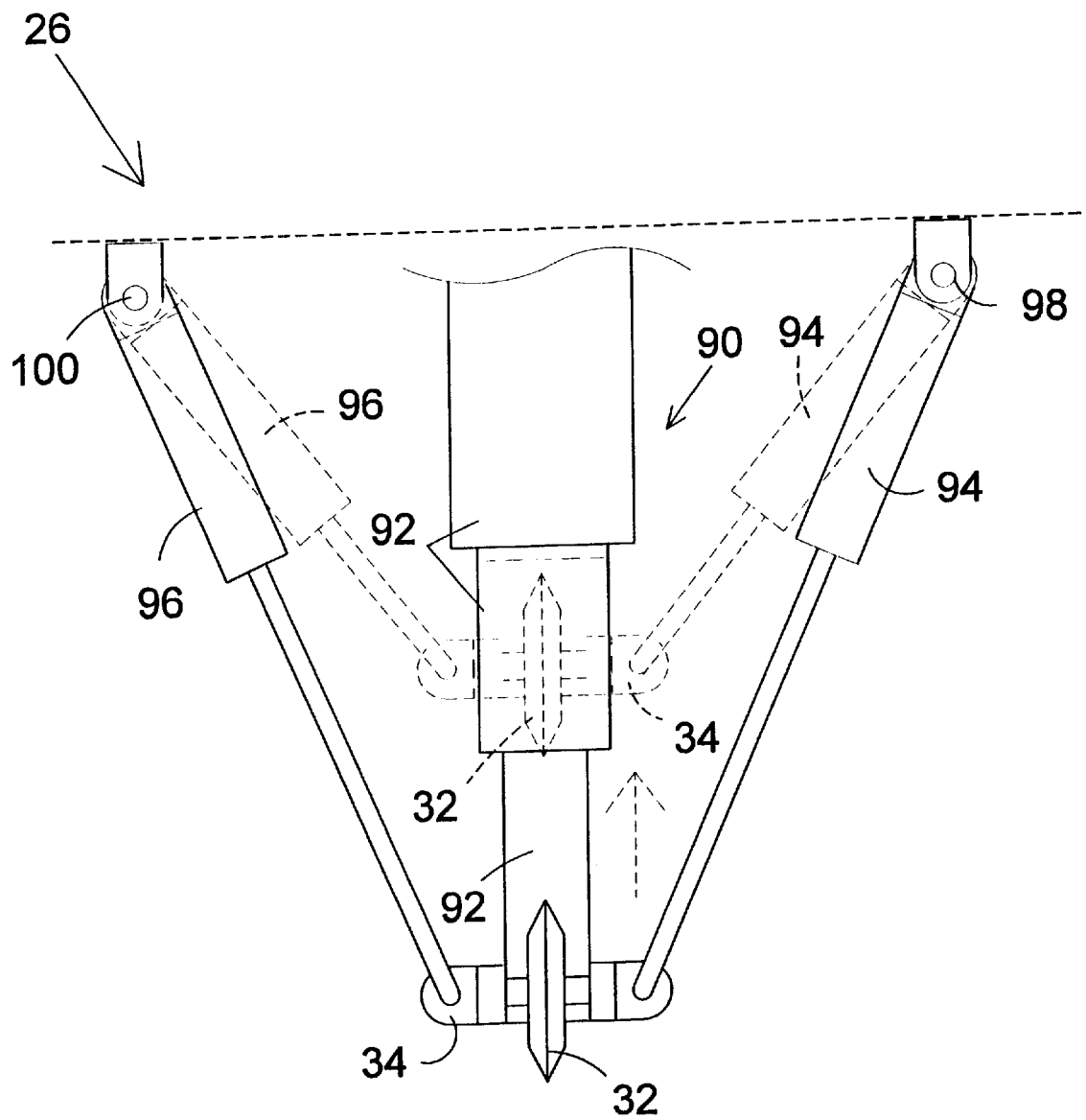
FIG. 15 is an enlarged view of the third embodiment of the anti ice skidding apparatus of present invention with the retracted non operative position of the apparatus being shown in dashed lines.

A third embodiment of the chassis bearing shaft 90 for the anti ice skidding apparatus 24 is shown in FIGS. 13, 14 and 15. The chassis bearing shaft 90 includes a plurality of interconnected hollow cylinders 92. The cylinders are positioned in a telescoping relationship whereby a top cylinder connected to the underside of the vehicle 26 has a largest circumference and each subsequent cylinder in the cylinder has a smaller circumference. The final cylinder having the smallest circumference is connected to the disc chassis 34 and moves therewith. First and second pistons 94 and 96, respectively, each include a respective piston rod 95 and 97, respectively, which are connected to an opposing side of the disc chassis 34. When the pistons 94 and 96 are activated to extend the piston rods, the piston rods 95 and 97 apply a pressure to the disc chassis 34 towards the roadway 12 and into the engaged position. As the disc chassis 34 moves with the piston rods 95 and 97 towards the roadway 12, the cylinder connected to the disc chassis 34 is also carried to towards the roadway 12. As the cylinder having the smallest circumference is carried towards the roadway 12 it is caused to extend from the cylinder to which it is connected. This continues for each subsequent cylinder until the rollers 32 engage the roadway 12.

FIG. 15 illustrates the movement of the anti ice skidding apparatus 24 from the engaged position to the disengaged position, the disengaged position of the elements being shown in dashed lines. As can be seen from this figure, when in the engaged position, the cylinders 92 forming the chassis bearing shaft 90 are in an extended position and the piston rods 95 and 97 are fully extended from the pistons 94 and 96. The pistons 94 and 96 are pivotally connected to the underside of the vehicle 26 at pivot points 98 and 100, respectively, and pivot outward when moving the apparatus 24 into the engaged position. When moving into the disengaged position, the piston rods are drawn into the pistons 94 and 96 and the cylinders 92 are collapsed into one another.

Figure 16:
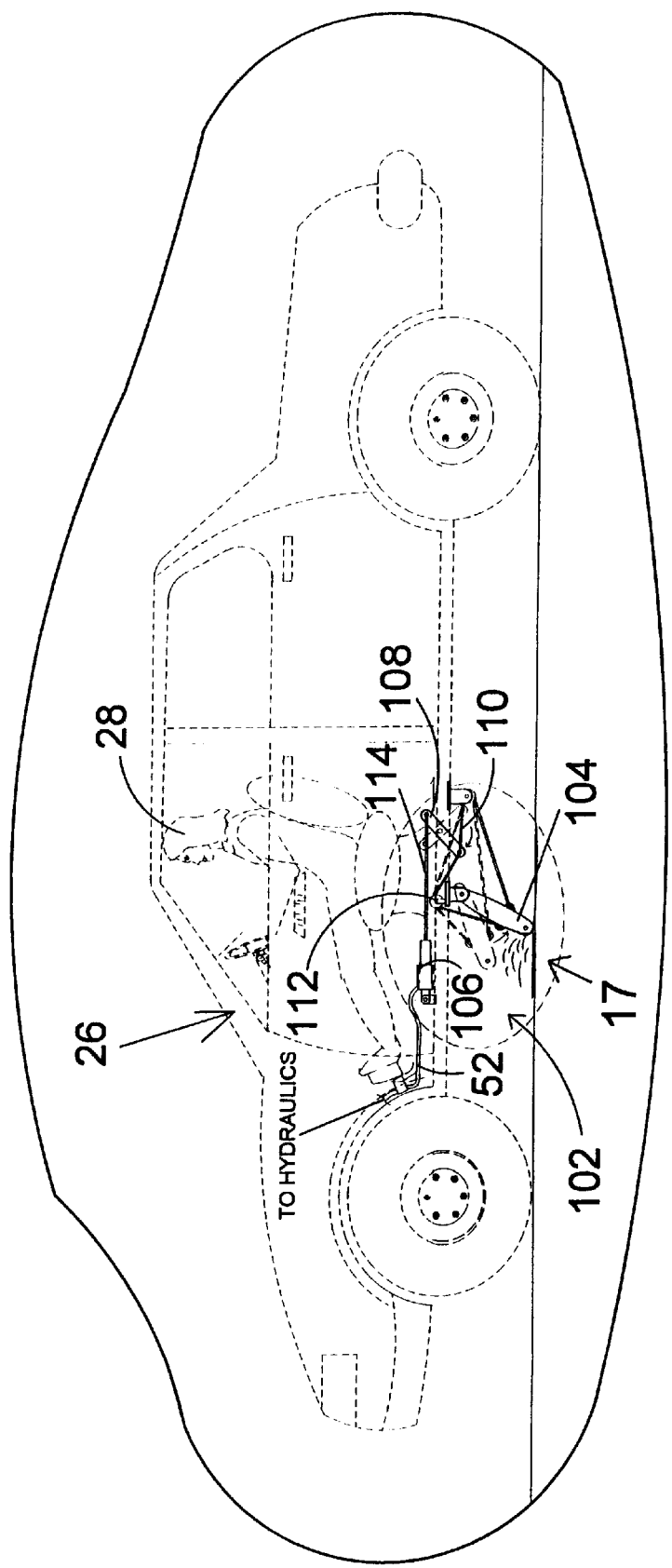
FIG. 16 is a perspective view of the anti ice skidding apparatus of the present invention including an additional blade for use as an additional braking device when engaging an icy surface.
Figure 17:
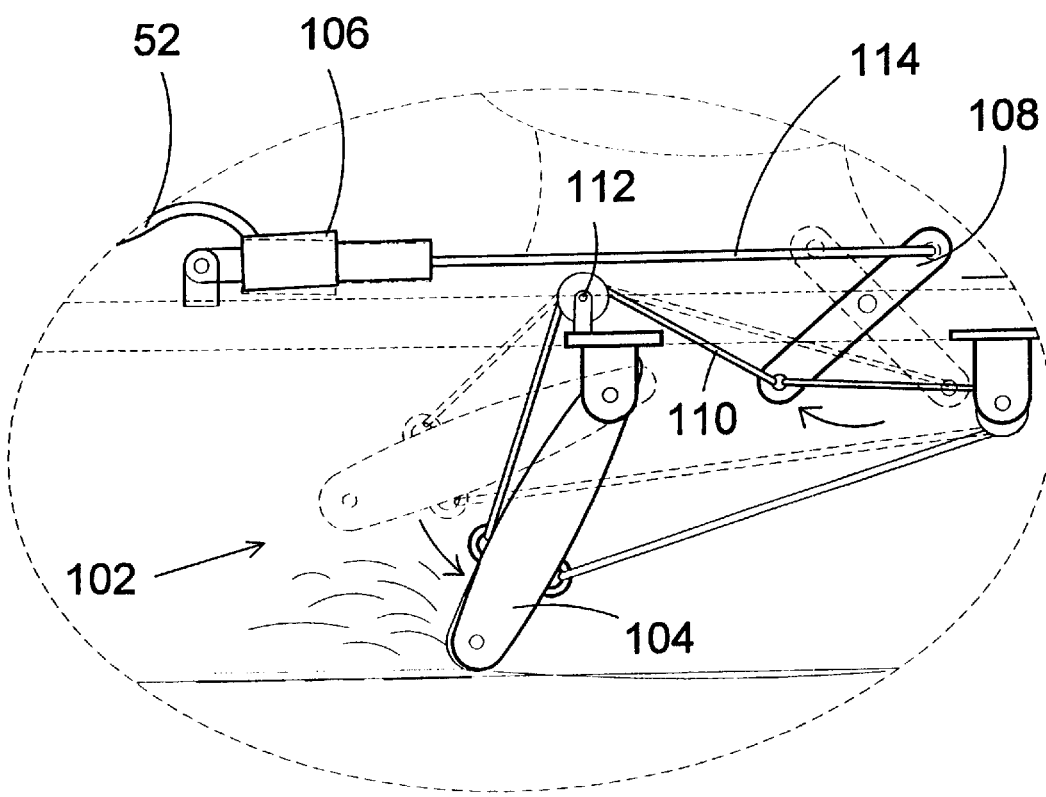
FIG. 17 is an enlarged view of the anti ice skidding apparatus of the present invention including the additional blade taken from within the circle labeled 17 of FIG. 16.

An alternate embodiment of the anti ice skidding apparatus 102 is illustrated in FIGS. 16 and 17. This embodiment includes a blade 104 including an hydraulic connection 106 and a cable connection 108 for extending and retracting the blade between an operative and at rest position. The hydraulic connection 106 is connected to the fluid line 52 through which the hydraulic fluid is caused to flow and the cable connection 108 is connected between the hydraulic connection 106 and the blade 104. The cable connection consists of a cable 110 and a pulley 112 through which the cable 110 extends to contact the blade 104. The opposite end of the cable is connected to a piston rod 114 of the piston forming the hydraulic connection 106. When in the operative position the blade 104 is utilized as a braking device able to provide friction with the icy surface of the roadway and to resist lateral forces on the vehicle in a manner similar to the rollers previously described.

When the operator 28 of the vehicle 26 applies a pressure to the pedal 48 within the cabin of the vehicle 26 as illustrated in FIG. 16, the hydraulic fluid is caused to flow through the fluid line 52 and into the hydraulic connection 106, e.g. hydraulic piston, causing the piston rod 110 to extend further from the piston. As the piston rod 110 is caused to extend further, a force is applied to the cable 110. The cable 110 causes the blade 114 to be lowered into the engaged position in response to the force and contact the roadway 12. When the pedal 48 is released, the force of the hydraulic fluid is removed from the piston causing the piston rod 114 to be retracted. As the piston is retracted, a force is applied to the cable 110 which pulls the blade towards the vehicle 26 removing the blade 104 from contact with the roadway 12.

Figure 18:
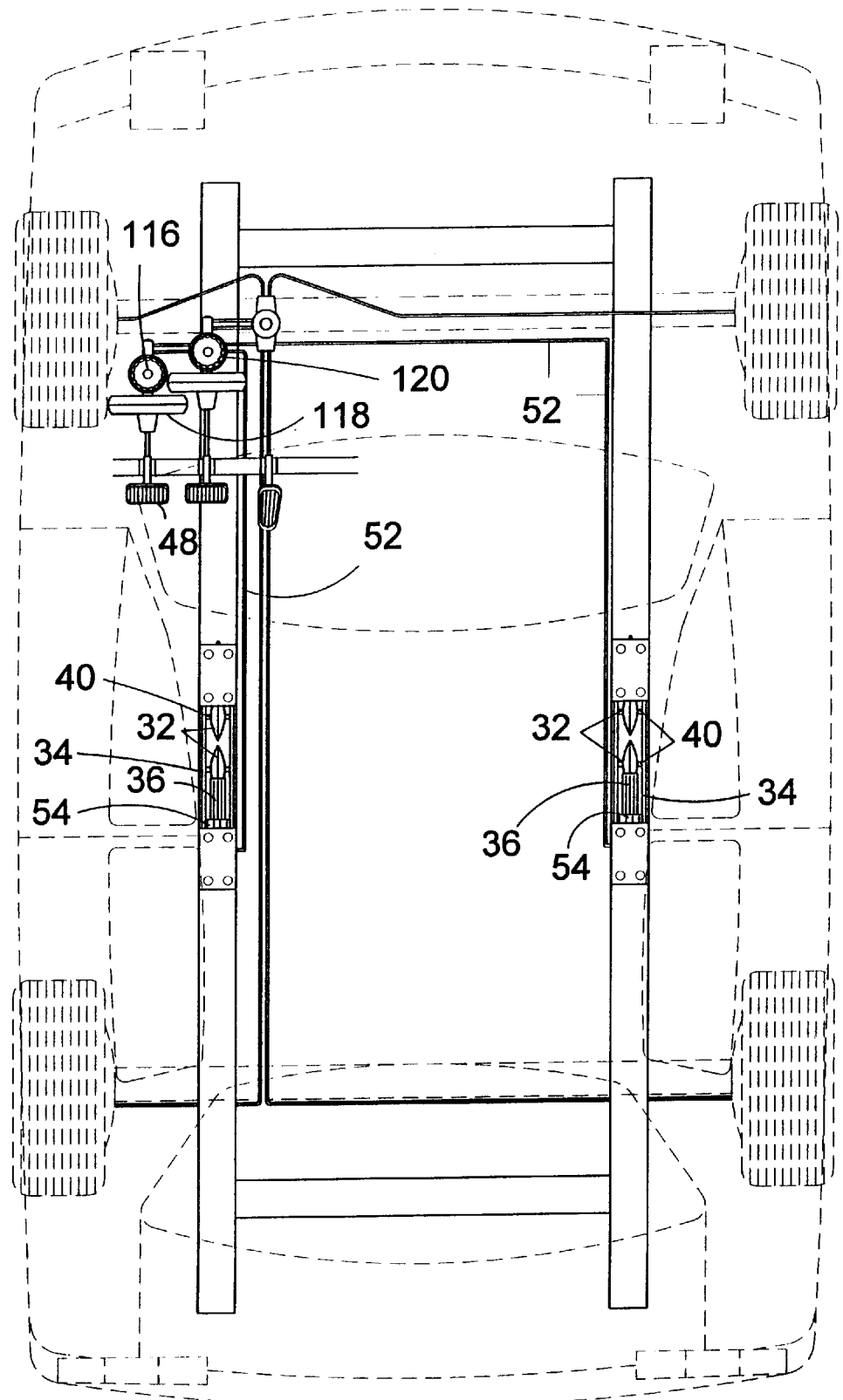
FIG. 18 is a bottom view of a vehicle having the anti ice skidding apparatus of the present invention connected to the under carriage thereof and having a dedicated hydraulic reservoir system.
Figure 19:
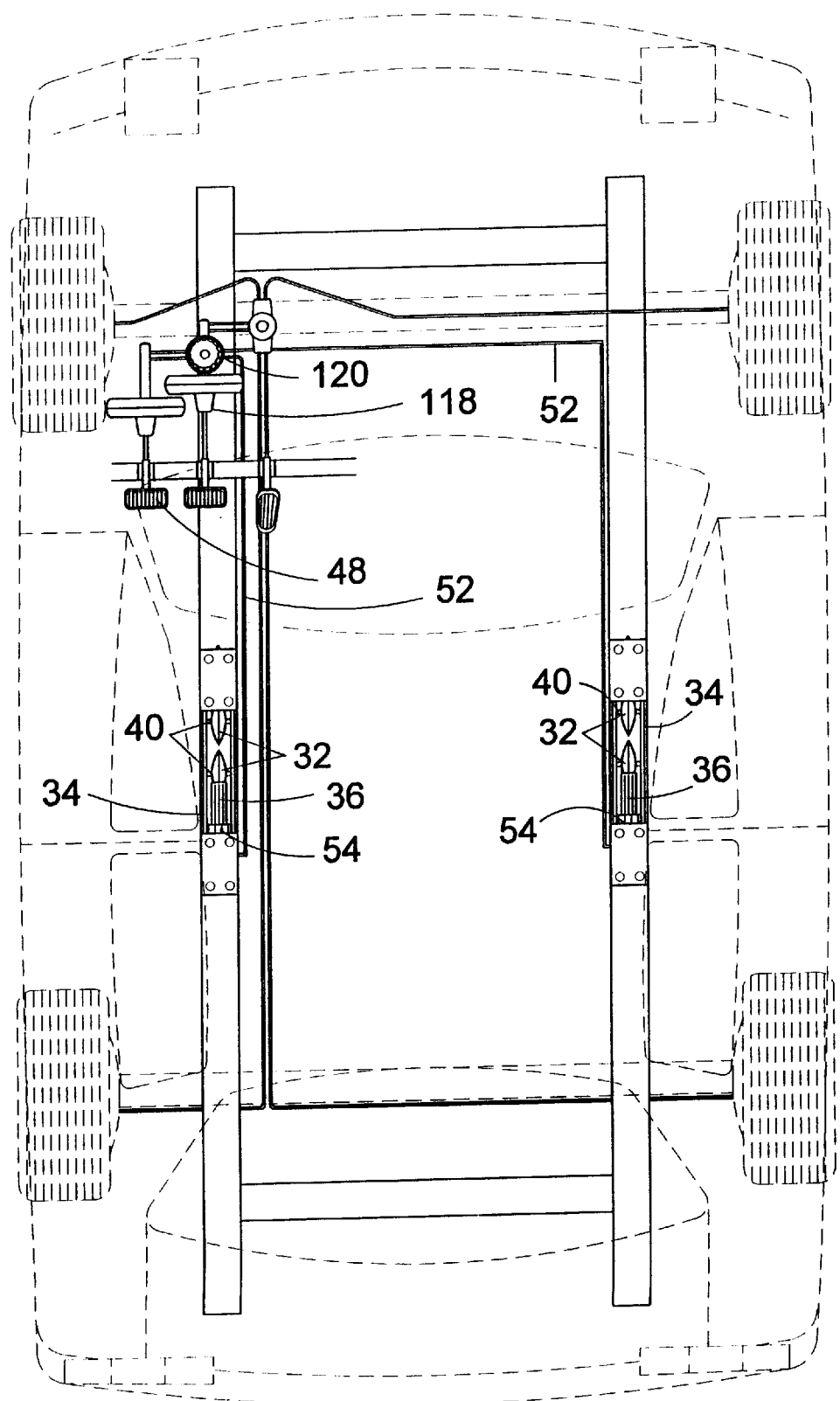
FIG. 19 is bottom view of a vehicle having the anti ice skidding apparatus of the present invention connected to the under carriage thereof and using the hydraulic reservoir system of the motor vehicle.

FIGS. 18 and 19 illustrate a bottom view of the vehicle 26 showing a preferred position for the anti ice skidding apparatus 10 or 102. As can be seen from these figures, one anti ice skidding apparatus 10 or 102 is positioned on either side of the vehicle and are both controlled by the same pedal 48. FIG. 18 illustrates the use of its own hydraulic reservoir 116 while the brake mechanism of the vehicle 118 uses a separate hydraulic reservoir 120. FIG. 19 illustrates use of the hydraulic reservoir 120 of the brake system 118 by the anti ice skidding apparatus 10. In either system application of a force to the pedal 48 will cause hydraulic fluid to flow in both fluid lines 52 causing the anti ice skidding apparatus 10 or 102 to thereby fill the piston 50 and cause the piston rod 60 to extend further therefrom. As explained previously, extending the piston rod 60 causes the chassis bearing shaft 36 to pivot towards the roadway 12 carrying the disc chassis 34 and rollers 32 therewith until the rollers 32 engage the roadway 12.

The operation of the anti ice skidding apparatus 10 will now be described with reference to the figures, and specifically the figures illustrating the first embodiment described. In operation, the anti ice skidding apparatus 10 is positioned on an underside of a vehicle 26 and connected to a hydraulic reservoir 58 via a fluid line 52 and an actuating switch or pedal 48. The pedal 48 is located in the cabin of the vehicle 26 at a position which is easily reached by a operator 46 of the vehicle 26.

When the vehicle 26 travels over a patch of ice 14 on the roadway 12 and begins to lose traction, the operator 46 will apply a pressure to the pedal 48 for activating the anti ice skidding apparatus 10 or 102. Activating of the pedal 48 connects the hydraulic reservoir 58 to the fluid line 52 allowing hydraulic fluid 62 to flow from the reservoir through the fluid line 52 and to the piston 50. The hydraulic fluid 62 is received within the piston 50 and applies a force to the piston rod 60 causing the piston rod 60 to be extended from the piston 50. The piston rod 60 extends through the recess 56 in the support structure 54 and connects to the chassis bearing shaft 36. As the piston rod 60 extends further from the piston 50, it is caused to travel along the recess 56 until it reaches the bottom of the recess 56. As the chassis bearing shaft 36 is connected to the piston rod 56, it is caused to pivot as the piston rod 60 travels along the length of the recess 56.

The disc chassis 34 includes a plurality of rollers 32 connected thereto, the rollers 32 contacting the icy patch 14 on the roadway 12 for providing resistance to any lateral forces acting on the vehicle 26. The disc chassis 34 is also pivotally connected to the chassis bearing shaft 36 and pivots therewith. As the chassis bearing shaft 36 pivots towards the roadway 12, the disc chassis 34 and rollers 32 pivot therewith until the rollers 32 engage the icy patch 14 on the roadway 12. As the rollers 32 include a sharp edge extending around the periphery thereof, the rollers are able to cut a groove into the icy patch 14 and travel along the groove created in the icy patch 14. The rollers 32 thus add to the stability and maneuverability of the vehicle 26 providing resistance to lateral forces acting on the vehicle 26 due to the engagement with the icy patch 14. The rollers 32 may also include teeth along the sharp edge 45 thereof for providing additional resistance to lateral forces and increased traction for the vehicle 26.

Once the vehicle passes over the icy patch 14, the operator will activate the pedal 48 again causing the hydraulic reservoir 58 to be cut off from the fluid line 52. Thus, the pressure applied on the piston rod 60 will be removed and the spring 66 within the piston 50 will cause the piston rod 60 to be retracted. The retraction of the piston rod 60 causes the piston rod 60 to ride up along the recess 56 with the chassis bearing shaft 36. As this occurs, the chassis bearing shaft 36 pivots away from the roadway 12 carrying the disc chassis 34 and rollers 32 with it. As the rollers 32 are lifted off of the roadway 12, the added resistance to the lateral forces is removed and the anti ice skidding apparatus 10 is placed in the at rest disengaged position until the pedal 48 is reactivated.

From the above description it can be seen that the anti ice skidding apparatus of the present invention is able to overcome the shortcomings of prior art devices by providing a anti ice skidding apparatus which is able to be connected to an undercarriage of a motor vehicle, resist lateral forces without impeding the forward momentum of the vehicle and be deployed for engagement with a surface on which the motor vehicle is traveling from within a motor vehicle. Deployment of the anti ice skidding apparatus is through use of an actuator switch connected to a hydraulic piston for activating an extender to a chassis bearing shaft for moving a plurality of sharp edged discs arrayed in a serial alignment to contact a surface on which the vehicle is traveling. The chassis bearing shaft may mount astride the disc chassis. Alternatively, the anti ice skidding apparatus may include a vertically mounted hydraulic piston connected to the disc chassis and divergent vertically mounted chassis bearing shafts also connected to the disc chassis. The anti ice skidding apparatus may also include a blade which is hydraulically deployed and is used as a brake for a motor vehicle while on an icy surface. Furthermore, the anti ice skidding apparatus of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An anti ice skidding apparatus for providing resistance to lateral forces acting on a vehicle, said anti ice skidding apparatus comprising:
   a) a disc chassis;
   b) means comprising a plurality of rollers for engaging a roadway pivotally connected to said disc chassis;
   c) means for securing said disc chassis to an underside of the vehicle;
   d) means connected to said securing means for pivoting said securing means between a first position maintaining said disc chassis and engaging means at a distance above the roadway and a second position placing said engaging means in engagement with the roadway whereby said engaging means is able to engage the roadway and provide additional resistance to lateral forces acting on the vehicle;
   e) said means for securing includes a support structure connected to a chassis bearing mount on an underside of the vehicle and a chassis bearing shaft pivotally connected to said support structure thereby said pivoting means is connected to said chassis bearing shaft and causes said chassis bearing shaft to pivot said disc chassis and rollers between said first and second positions;

f) said chassis bearing mount includes a plurality of telescopically connected cylinders, a first one of said cylinders having a largest circumference and being connected to said support structure and a last one of said cylinders having a smallest diameter and being connected to said disc chassis; and g) said means for pivoting includes first and second pistons connected on opposing sides of said disc chassis for moving said telescoped cylinders between a first collapsed position in which said engaging means is at a distance from said roadway and a second extended position in which said engaging means is engaged with the roadway.

2. The anti ice skidding apparatus as recited in claim 1, wherein said rollers include a sharp edge extending around a periphery thereof, said sharp edge acting to cut a groove on any icy or soft surfaces over which the vehicle passes when said disc chassis and rollers are in said second engaged position.

3. The anti ice skidding apparatus as recited in claim 1, further comprising an hydraulic reservoir and a fluid line connecting said hydraulic reservoir to said pistons, said hydraulic reservoir providing hydraulic fluid to said pistons through said fluid line when said chassis bearing shaft is pivoting said disc chassis into said second engaged position.

4. The anti ice skidding apparatus as recited in claim 3, further comprising an actuation switch connecting said hydraulic reservoir to said fluid line, said actuation switch being positioned within a cabin of the vehicle and easily reachable by the operator for connecting said hydraulic reservoir to said fluid line to allow hydraulic fluid to pass to the pistons.

5. The anti ice skidding apparatus as recited in claim 4, wherein said actuation switch is a pedal positioned adjacent the operators feet while driving the vehicle.

6. The anti ice skidding apparatus as recited in claim 4, wherein said hydraulic reservoir is the hydraulic reservoir used by a braking system of the vehicle.

\* \* \* \* \*